US012715426B2

(12) United States Patent
Ramdas et al.

(10) Patent No.: US 12,715,426 B2
(45) Date of Patent: Aug. 25, 2026

(54) EMISSIONS MANAGEMENT FOR DIESEL SERIES HYBRID POWERTRAINS

(71) Applicant: Cummins Inc., Columbus, IN (US)

(72) Inventors: Sangeetha Ramdas, Columbus, IN (US); Carlos Alcides Lana, Columbus, IN (US); Kesavan Ramakrishnan, Columbus, IN (US); Lu Qiu, Columbus, IN (US); Muhammad Qaisar Fahim, Memphis, TN (US); Dat Duc Le, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 19/226,096

(22) Filed: Jun. 2, 2025

(65) Prior Publication Data

US 2025/0376149 A1 Dec. 11, 2025

Related U.S. Application Data

(60) Provisional application No. 63/657,699, filed on Jun. 7, 2024.

(51) Int. Cl.
*B60W 20/16* (2016.01)
*B60W 10/06* (2006.01)
(Continued)

(52) U.S. Cl.
CPC ............ *B60W 20/16* (2016.01); *B60W 10/06* (2013.01); *B60W 10/30* (2013.01); *F01N 3/2006* (2013.01);
(Continued)

(58) Field of Classification Search
CPC ...... B60W 20/16; B60W 10/06; B60W 10/30; B60W 2510/244; B60W 2710/0677;
(Continued)

(56) References Cited

U.S. PATENT DOCUMENTS

| | | | |
|---|---|---|---|
| 4,512,147 | A | 4/1985 | Wong |
| 5,634,330 | A | 6/1997 | Achleitner |

(Continued)

FOREIGN PATENT DOCUMENTS

| | | | |
|---|---|---|---|
| CN | 103573347 | B | 10/2017 |
| DE | 41 34 449 | A1 | 4/1992 |

(Continued)

OTHER PUBLICATIONS

Selleri, et al An Overview of Lean Exhaust deNOx Aftertreatment Technologies and NOx Emission Regulations in the European Union.

(Continued)

*Primary Examiner* — Hoang M Nguyen
(74) *Attorney, Agent, or Firm* — Foley & Lardner LLP

(57) ABSTRACT

A system for managing emissions of a vehicle includes a controller to perform: activating a heater responsive to a battery state of charge being at or above a predefined threshold, activating an air mover, causing the moving air to be heated to heat an aftertreatment system, receiving an aftertreatment system temperature responsive to activating the air mover, causing the engine to operate in a modified power mode where a power output of the engine is below a power output threshold, responsive to the temperature being at or above a first threshold and below a second threshold, causing the engine to operate the engine in a normal operating mode where the power output of the engine is at or above the power output threshold, responsive to the temperature being at or above the second threshold, and deactivating the heater when the temperature is at or above the second threshold.

20 Claims, 8 Drawing Sheets

(51) Int. Cl.
*B60W 10/30* (2006.01)
*F01N 3/20* (2006.01)

(52) U.S. Cl.
CPC ..... *F01N 3/2093* (2013.01); *B60W 2510/244* (2013.01); *B60W 2710/0677* (2013.01); *B60W 2710/30* (2013.01); *F01N 2900/1602* (2013.01); *F01N 2900/1824* (2013.01)

(58) Field of Classification Search
CPC ..... B60W 2710/30; B60W 2710/0616; B60W 2710/0627; B60W 2710/0633; B60W 2050/041; B60W 2050/043; B60W 20/40; B60W 30/1882; B60W 2530/12; B60W 10/08; B60W 10/26; B60W 20/11; B60W 20/13; B60W 20/15; B60W 30/182; F01N 3/2006; F01N 3/2093; F01N 2900/1602; F01N 2900/1824; F01N 3/2013; F01N 3/2026; F01N 3/2066; F01N 3/30; F01N 9/00; F01N 2240/16; F01N 2590/11; F01N 2610/02; F01N 2900/08; F01N 2900/104; B60K 6/485
See application file for complete search history.

(56) References Cited

U.S. PATENT DOCUMENTS

| | | | | |
|---|---|---|---|---|
| 5,823,170 | A | 10/1998 | Sienicki | |
| 6,301,879 | B1 | 10/2001 | Weisweiler et al. | |
| 7,503,168 | B2 | 3/2009 | Clerc et al. | |
| 8,109,079 | B2 | 2/2012 | Wills et al. | |
| 8,209,963 | B2 | 7/2012 | Kesse et al. | |
| 8,356,472 | B2 | 1/2013 | Hiranuma et al. | |
| 8,621,847 | B2 | 1/2014 | Gonze et al. | |
| 8,800,274 | B2 | 8/2014 | Sun et al. | |
| 8,820,050 | B2 | 9/2014 | Dubkov et al. | |
| 8,883,102 | B1 * | 11/2014 | Lambert | B01D 53/9418 60/299 |
| 9,371,760 | B2 | 6/2016 | Hirth et al. | |
| 9,512,764 | B2 | 12/2016 | Upadhyay et al. | |
| 10,378,407 | B2 | 8/2019 | Kanno et al. | |
| 10,746,071 | B2 | 8/2020 | Clayton, Jr. | |
| 10,767,584 | B2 | 9/2020 | Haas et al. | |
| 11,143,075 | B2 | 10/2021 | Bunkus | |
| 11,193,438 | B1 | 12/2021 | Zhang | |
| 11,293,362 | B2 | 4/2022 | Tolley | |
| 11,506,136 | B1 | 11/2022 | Harris | |
| 12,128,898 | B2 * | 10/2024 | Bare | B60W 30/18127 |
| 2010/0058738 | A1 | 3/2010 | Webb et al. | |
| 2010/0154745 | A1 | 6/2010 | Gaiser | |
| 2014/0039781 | A1 | 2/2014 | Theis et al. | |
| 2015/0013309 | A1 | 1/2015 | Upadhyay et al. | |
| 2022/0025797 | A1 | 1/2022 | Tolley et al. | |
| 2022/0145789 | A1 | 5/2022 | Dahl | |
| 2022/0371575 | A1 * | 11/2022 | Volmerding | F01N 3/106 |
| 2023/0003163 | A1 * | 1/2023 | Stenqvist | F02D 41/021 |
| 2023/0108972 | A1 * | 4/2023 | Dahl | F01N 3/2066 60/273 |

FOREIGN PATENT DOCUMENTS

| | | | |
|---|---|---|---|
| EP | 3 557 016 | B1 | 10/2019 |
| JP | 2018-149834 | A | 9/2018 |
| WO | WO-2006/087541 | A1 | 8/2006 |
| WO | WO-2009/034663 | A1 | 3/2009 |
| WO | WO-2009/091470 | A2 | 7/2009 |
| WO | WO-2023/192615 | A1 | 10/2023 |

OTHER PUBLICATIONS

Song, A SCR Model based on Reactor and Engine Experimental Studies for a Cu-zeolite Catalyst, Copyright 2013 Xiaobo Song.

* cited by examiner

EMISSIONS MANAGEMENT FOR DIESEL SERIES HYBRID POWERTRAINS

CROSS-REFERENCE TO RELATED APPLICATION

This application claims the benefit of and priority to U.S. App. No. 63/657,699, filed Jun. 7, 2024, which is incorporated herein by reference in its entirety and for all purposes.

TECHNICAL FIELD

The present disclosure relates generally to the field of managing engine emissions. More specifically, the present disclosure relates to managing engine emissions in a hybrid vehicle.

BACKGROUND

An engine may be coupled to an exhaust aftertreatment system to reduce harmful exhaust gas emissions such as nitrogen oxides (NOx), carbon monoxides (CO), unburnt hydrocarbons, particulate matter, etc. One or more components of the aftertreatment system may operate within a predetermined temperature range. For example, a catalyst may convert harmful exhaust gas emissions more effectively within a predetermined temperature range. A temperature of the exhaust gas may change as operating conditions of the engine and/or system change. When the exhaust gas temperature changes, the temperature of the components of the aftertreatment system may change, thereby affecting the ability of the aftertreatment system to operate as intended. Another contributor to harmful exhaust gas emissions (e.g., NOx) can include low ammonia storage in a selective catalytic reduction (SCR) catalyst. For example, when the ammonia storage in the SCR catalyst is below a threshold value, the NOx conversion rate of the catalyst may decrease, resulting in an increased amount of NOx exiting the exhaust aftertreatment system. Still another contributor to harmful exhaust gas emissions (e.g., NOx) includes NOx on an ammonia slip catalyst (ASC). For example, ammonia released by the SCR catalyst may result in the formation of NOx within the aftertreatment system, resulting in an increased amount of NOx exiting the exhaust aftertreatment system.

SUMMARY

One embodiment relates to a system for managing emissions of a hybrid vehicle. The system includes: a controller including at least one processor and at least one memory device storing instructions that, when executed by the at least one processor, cause the controller to perform operations including: activating a heater responsive to a state of charge of a battery of the hybrid vehicle being at or above a predefined threshold, activating an air mover to move air through an aftertreatment system of the hybrid vehicle and causing the air to be heated by the heater such that the heated air heats the aftertreatment system, receiving a temperature of the aftertreatment system responsive to activating the air mover, causing an engine of the hybrid vehicle to operate in a modified power mode such that a power output of the engine is below a power output threshold responsive to determining that the temperature of the aftertreatment system is at or above a first threshold and below a second threshold, causing the engine to operate in a normal operating mode such that the power output of the engine is at or above the power output threshold responsive to determining that the temperature of the aftertreatment system is at or above the second threshold, and deactivating the heater responsive to determining that the temperature of the aftertreatment system is at or above the second threshold.

One embodiment relates to a system for managing emissions of a hybrid vehicle. The system includes a battery and a controller coupled to the battery. The controller includes at least one processor and at least one memory device storing instructions that, when executed by the at least one processor, cause the controller to perform operations including: determining an end of a drive cycle of the hybrid vehicle, receiving a temperature of an aftertreatment system responsive to determining the end of the drive cycle of the hybrid vehicle, determining an ammonia-to-NOx ratio (ANR) of the aftertreatment system responsive to determining the end of the drive cycle of the hybrid vehicle, and managing an operation of an engine of the hybrid vehicle to at least one of (i) lower the temperature of the aftertreatment system responsive to determining that the temperature of the aftertreatment system is at or above a first threshold or (ii) lower the ANR of the aftertreatment system responsive to determining that the ANR of the aftertreatment system is below a second predefined threshold.

One embodiment relates to a system for managing emissions of a hybrid vehicle. The system includes a controller comprising at least one processor and at least one memory device storing instructions that, when executed by the at least one processor, cause the controller to perform operations including: activating an air mover to move air through an aftertreatment system responsive to determining that an ammonia level in the aftertreatment system is below a first predefined threshold, increasing a temperature of the moving air relative to a current temperature of the moving air responsive to activating the air mover, activating a doser of the aftertreatment system responsive to the temperature of the moving air being at or above a second predefined threshold, and starting an engine of the hybrid vehicle responsive to the ammonia level of the aftertreatment system being at or above the first predefined threshold.

One embodiment relates to a system for managing emissions of a hybrid vehicle. The system includes: a controller including at least one processor and at least one memory device storing instructions that, when executed by the at least one processor, cause the controller to perform operations including: starting an engine of the hybrid vehicle, determining an ammonia to NOx ratio (ANR) responsive to starting the engine, increasing the ANR relative to a current ANR, responsive to determining that the current ANR is below a predefined threshold, controlling operation of the engine to limit an amount of NOx exiting the engine, responsive to determining that the current ANR is below a predefined threshold, and disabling a limit of the operation of the engine responsive to determining that the ANR is at or above the predefined threshold.

One embodiment relates to a system for managing emissions of a hybrid vehicle. The system includes: a controller including at least one processor and at least one memory device storing instructions that, when executed by the at least one processor, cause the controller to perform operations including: determining an ammonia level in an aftertreatment system of the hybrid vehicle, determining an ammonia-to-NOx ratio (ANR) of the aftertreatment system of the vehicle, responsive to determining that the ammonia level in the aftertreatment system is at or above a predefined threshold, increasing an amount of NOx exiting an engine of the vehicle, relative to a current amount of NOx exiting the engine, and responsive to determining that the ANR is at or above a predefined threshold, decreasing the ANR responsive to determining that the ANR is at or above the predefined threshold, and controlling operation of the engine to limit a temperature of gas within the aftertreatment system, responsive to determining that the ANR is at or above the predefined threshold, wherein controlling operation of the engine to limit the temperature of the gas comprises modulating a power level of the engine to limit a rate of change of a catalyst temperature.

One embodiment relates to a system for managing emissions of a hybrid vehicle. The system includes: a controller including at least one processor and at least one memory device storing instructions that, when executed by the at least one processor, cause the controller to perform operations including: determining a temperature of a catalyst of an aftertreatment system, determining a state of charge of a battery of the vehicle, responsive to one or more of the temperature of the catalyst being at or above a predetermined temperature threshold or the state of charge being at or above a predetermined state of charge threshold, turning off an engine of the vehicle, responsive to turning off the engine, causing the engine to motor at a first speed, and responsive to one or more of the temperature of the catalyst being below the predetermined temperature threshold or the state of charge being below the predetermined state of charge threshold and after turning off the engine, turning on the engine.

One embodiment relates to a method for managing emissions of a hybrid vehicle. The method includes: activating, by one or more processors, an air mover to move air through an aftertreatment system responsive to determining that an ammonia level in the aftertreatment system is below a first predefined threshold, increasing, by the one or more processors, a temperature of the moving air relative to a current temperature of the moving air responsive to activating the air mover, activating, by the one or more processors, a doser of the aftertreatment system responsive to the temperature of the moving air being at or above a second predefined threshold, and starting or enabling a starting of, by the one or more processors, an engine of the vehicle responsive to the ammonia level of the aftertreatment system being at or above the first predefined threshold.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
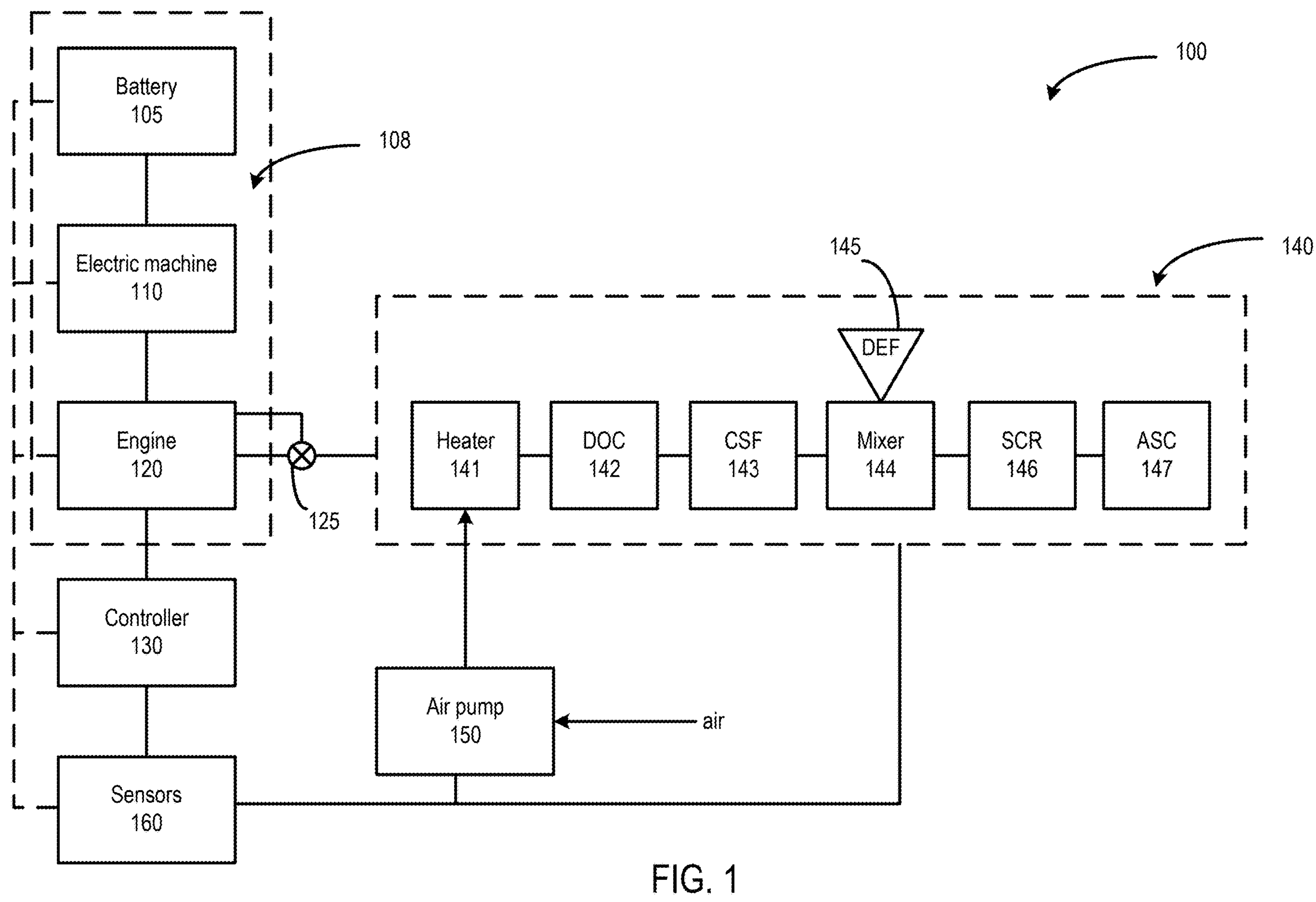
FIG. 1 is a block diagram of a system for managing emissions of a vehicle, according to an exemplary embodiment.

Following below are more detailed descriptions of various concepts related to, and implementations of, methods, apparatuses, and systems for managing emissions of diesel series hybrid powertrains. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

Technically and beneficially, the systems, methods, computer-readable media, and apparatuses described herein provide management of emissions for hybrid powertrains and, particularly diesel-fueled series hybrid powertrains. As described herein, a series hybrid vehicle architecture may provide benefits such as complete decoupling of an engine and a traction system depending on a state of charge (SOC) and/or capacity of a battery. Therefore, engine operations may include a certain level of independence from a driver request, and engine operations can be managed to reduce emissions. For example, the engine may be turned off while the electric powertrain provides power to the wheels of the vehicle. A series hybrid architecture also allows an electric machine (e.g., a motor or a motor generator) coupled to the engine to move air to or through a catalyst of an aftertreatment system of the vehicle while the engine is turned off, thus causing the engine to act as a pump. The systems, methods, and apparatuses described herein may be applicable to both hybrid vehicle certification and in-vehicle-use emissions management control.

As described herein, an engine system may include an engine and an exhaust aftertreatment system in exhaust gas receiving communication with the engine. The exhaust aftertreatment system may include one or more components, such as a particulate filter configured to remove particulate matter, such as soot, from exhaust gas flowing in the exhaust gas conduit system, a dosing module or system (e.g., comprising a doser) configured to supply a dosing fluid to the exhaust gas flowing in the aftertreatment system, and one or more catalyst devices configured to facilitate conversion of the exhaust gas constituents (e.g., nitrogen oxides, NOx, unburnt hydrocarbons (HC), carbon monoxide (CO), etc.) to less harmful elements (e.g., $CO_2$, water, nitrogen ($N_2$), etc.), such as an oxidation catalyst, a selectively catalytic reduction (SCR) system, a three-way catalyst, and so on. NOx emissions may be harmful to the environment, and it therefore may be beneficial to minimize harmful exhaust emissions, particularly NOx.

Some systems may include an electric or hybrid powertrain components. The amount of electrical power used by electric or hybrid powertrain components may change over the course of operating these systems.

The present disclosure describes and discloses various strategies to manage and reduce emissions from a diesel series hybrid powertrain (e.g., to address the various factors that cause NOx generation). For example, increasing a temperature value of a selective catalytic reduction (SCR) catalyst may increase a conversion efficiency so that NOx is more efficiently converted into $N_2$ and $H_2O$. In various embodiments, a diesel series hybrid powertrain may allow the engine and the driver to be temporarily decoupled. As a result, the engine may be able to be operated independently of any needs from the driver in order to limit NOx emissions without disruption or interruption to the driver, since power can be supplemented by a battery. These and other features and benefits are described more fully herein below.

Referring now to FIG. 1, a system 100 is shown, according to an exemplary embodiment. The system 100 may be embodied in vehicle, which may be configured as an on-road or an off-road (e.g., front end loaders, bulldozers, etc.) including, but not limited to, line-haul trucks, mid-range trucks (e.g., pick-up trucks), cars (e.g., sedans), and any other type of vehicle. In other embodiments, the system 100, or portions thereof, may be embodied in non-vehicle applications, such as in generator sets. It should be also understood that in other embodiments, more, different, and/or fewer components of the system 100 may be included in the system 100 without departing from the spirit and scope of the present disclosure.

Figure 2:
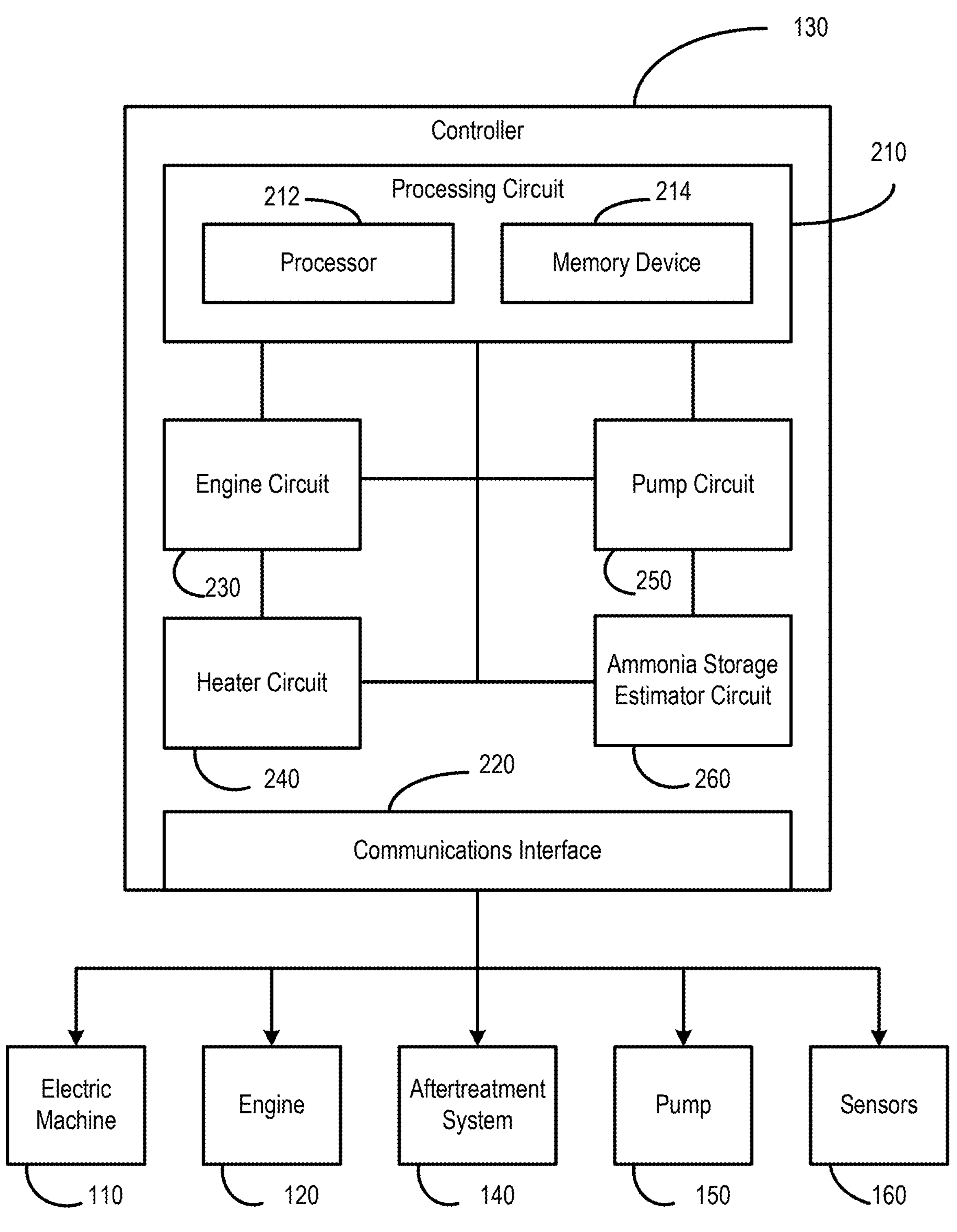
FIG. 2 is a block diagram of a controller of the system of FIG. 1, according to an exemplary embodiment.

The system 100 is shown to include a battery 105, an electric machine 110, an engine 120, an exhaust gas recirculation (EGR) control valve 125, an aftertreatment system 140 in exhaust gas receiving communication with the engine 120, an air pump 150, and sensors 160. The system 100 may also include a controller 130 (as shown in FIG. 2), where the controller 130 is communicably coupled to each of the aforementioned components. In some embodiments, the EGR control valve 125 is disposed between the engine 120 and the aftertreatment system 140. In some embodiments, the system 100 also includes a turbo device disposed between the engine 120 and the aftertreatment system 140, such that the turbo device is in exhaust gas receiving communication with the engine 120 and exhaust gas providing communication with the aftertreatment system 140 via the EGR valve 125. In these embodiments, the aftertreatment system 140 is in exhaust gas receiving communication with the engine 120 (e.g., via the turbo device and the EGR valve).

The system 100 may be embodied in a vehicle, as in the example shown. The vehicle may be structured as a hybrid vehicle, such as a series hybrid vehicle that includes one or more electric motors and one or more internal combustion engines. In the example shown, the system 100 is driven, at least partly, by an internal combustion engine, shown as an engine 120. According to one embodiment, the engine 120 is structured as a compression-ignition internal combustion engine that utilizes diesel fuel. However, in various alternate embodiments, the engine 120 may be structured as any other type of engine (e.g., spark-ignition) that utilizes any type of fuel (e.g., gasoline, natural gas, hydrogen, etc.). In various embodiments, managing emissions by reducing cold start emissions may be used within series hybrid powertrains that utilize a fuel source other than diesel (e.g., gasoline). Within the engine 120, air from the atmosphere is combined with fuel, and combusted, to power the engine 120. Combustion of the fuel and air in the compression chambers of the engine 120 produces exhaust gas that is operatively vented to an exhaust manifold and to the exhaust aftertreatment system 140.

The engine 120 may power and/or propel the vehicle embodying the system 100 via a powertrain 108. The powertrain 108 may be a series electric/hybrid powertrain. The powertrain 108 may include at least the electric machine 110 and the engine 120. In various embodiments, the powertrain 108 may include one or more batteries 105.

The powertrain 108 may include one or more batteries 105 and/or one or more electric machines 110, such as a motor and/or motor generator. The battery 105 may be used to power the electric machine 110. The electric machine 110 may include a torque assist feature, a regenerative braking energy capture ability, a power generation ability, and any other feature of motor generators used in hybrid vehicles. The electric machine 110 may include a power conditioning device such as an inverter and a motor controller.

As shown in FIG. 1, the system 100 includes an aftertreatment system, shown as exhaust aftertreatment system 140. The exhaust aftertreatment system 140 is in exhaust gas-receiving communication with the engine 120.

In the example depicted, the exhaust aftertreatment system 140 includes a heater 141, a diesel oxidation catalyst (DOC) 142, a catalyzed soot filter (CSF) 143, a mixer 144, a selective catalytic reduction (SCR) system with a SCR catalyst 146, and an ammonia slip catalyst (ASC) 147. The mixer 144 further includes a reductant delivery system, shown as a reductant doser 145. The reductant delivery system may include a reductant source, shown as diesel exhaust fluid (DEF) source, that supplies reductant (e.g., DEF, ammonia) to the reductant doser 145 via a reductant line. It should be noted that the components of the exhaust aftertreatment system 140 may be in any order, or different components and/or a different aftertreatment architecture may be used. In another example, the mixer 144 or SCR catalyst 146 may include multiple reductant dosers positioned along the exhaust aftertreatment system 140. Although the exhaust aftertreatment system 140 shown includes one of the heater 141, the DOC 142, the CSF 143, the mixer 144, the SCR catalyst 146, and the ASC catalyst 147 positioned in specific locations relative to each other along the exhaust flow path, in other embodiments, the exhaust aftertreatment system 140 may include more than one of any of the various catalysts positioned in any of various positions relative to each other along the exhaust flow path as desired. Therefore, the architecture of the exhaust aftertreatment system 140 shown in FIG. 1 is for illustrative purposes and should not be limiting.

The heater 141 may be positioned within the aftertreatment system 140 to heat, either directly or indirectly one or more catalyst members of the aftertreatment system 140. For example, a heater in the aftertreatment system 140 may be coupled upstream of the catalyst member to heat the exhaust gas (e.g., so as to enable thermal transfer from the exhaust gas to the catalyst member). In various embodiments, the heater 141 may be positioned downstream of the engine 120 and upstream of the aftertreatment system 140. In various embodiments, the heater 141 may be located, for example, at an outlet of a turbine, an inlet of the DOC 142, and/or an inlet of the SCR catalyst 146. In various embodiments, the aftertreatment system 140 may include a plurality of heaters 141 positioned at various locations throughout the aftertreatment system 140. The heater 141 may be operable to heat exhaust flowing therethrough. For example, as the exhaust flows the through the heater 141, the heater 141 heats the exhaust. The heated exhaust may then transfer the heat to one or more other components of the aftertreatment system 140. In this way, the heater 141 may be heating one or more components of the aftertreatment system 140 that are downstream of the heater 141. In various embodiments, the heater may be an electric heater or any other type of heater.

The DOC 142 may have any of various flow-through designs. Generally, the DOC 142 is structured to oxidize at least some particulate matter, e.g., the soluble organic fraction of soot, in the exhaust and reduce unburned hydrocarbons and carbon monoxide (CO) in the exhaust to less environmentally harmful compounds. For example, the DOC 142 may be structured to reduce the hydrocarbon and CO concentrations in the exhaust to meet the requisite emissions standards for those components of the exhaust gas. An indirect consequence of the oxidation capabilities of the DOC 142 is the ability of the DOC 142 to oxidize NO into $NO_2$. In this manner, the level of $NO_2$ the DOC 142 is equal to the $NO_2$ in the exhaust gas generated by the engine 120 plus the $NO_2$ converted from NO by the DOC 142.

In addition to treating the hydrocarbon and CO concentrations in the exhaust gas, the DOC 142 may also be used in the controlled regeneration of the CSF 143, the mixer 144, the SCR catalyst 146, and the ASC catalyst 147. This can be accomplished through the injection, or dosing, of unburned HC into the exhaust gas upstream of the DOC 142. Upon contact with the DOC 142, the unburned HC undergoes an exothermic oxidation reaction which leads to an increase in the temperature of the exhaust gas exiting the DOC 142 and subsequently entering the CSF 143, the mixer 144, the SCR catalyst 146, and/or the ASC catalyst 147. The amount of unburned HC added to the exhaust gas is selected to achieve the desired temperature increase or target controlled regeneration temperature.

The CSF 143 may be any of various flow-through or wall-flow designs, and is structured to reduce particulate matter concentrations, e.g., soot and ash, in the exhaust gas to meet or substantially meet requisite emission standards. The CSF 143 captures particulate matter and other constituents, and thus may need to be periodically regenerated to burn off the captured constituents. Additionally, the CSF 143 may be structured to oxidize NO to form $NO_2$ independent of the DOC 142.

The mixer 144 may include the reductant doser 145, a pump, and a delivery mechanism or doser. The mixer 144 may be a mixing chamber in which the DEF is hydrolyzed. When DEF is hydrolyzed, ammonia gas may be released and mixed with the exhaust gas passing through the mixer 144. The reductant source can be a container or tank capable of retaining a reductant, such as, for example, ammonia ($NH_3$), or DEF (e.g., urea). The reductant source is in reductant supplying communication with the pump, which is structured to pump reductant from the reductant source to the reductant doser 145 via a reductant delivery line. The reductant doser 145 may be positioned upstream of the mixer 144 and/or the SCR catalyst 146. The reductant doser 145 is selectively controllable to inject reductant directly into the exhaust gas prior to entering the mixer 144 or the SCR catalyst 146. In some embodiments, the reductant may either be ammonia or DEF, which decomposes to produce ammonia. As briefly described above, the ammonia reacts with NOx in the presence of the SCR catalyst 146 to reduce the NOx to less harmful emissions, such as $N_2$ and $H_2O$. The NOx in the exhaust gas includes $NO_2$ and NO. Generally, both $NO_2$ and NO are reduced to $N_2$ and $H_2O$ through various chemical reactions driven by the catalytic elements of the SCR catalyst 146 in the presence of reductant such as $NH_3$.

The SCR catalyst 146 may be any of various catalysts known in the art. For example, in some implementations, the SCR catalyst 146 is a vanadium-based catalyst, and in other implementations, the SCR catalyst 146 is a zeolite-based catalyst, such as a Cu-Zeolite or a Fe-Zeolite catalyst. The SCR catalyst 146 is configured to bind the reductant in the exhaust gas and facilitate reactions between the bound reductant and NOx in the exhaust gas to reduce the NOx in the exhaust gas into less harmful compounds.

The ASC catalyst 147 may be any of various flow-through catalysts structured to react with ammonia to produce mainly nitrogen. As briefly described above, the ASC catalyst 147 is structured to remove ammonia that has slipped through or exited the SCR catalyst 146 without reacting with NOx in the exhaust. In certain instances, the exhaust aftertreatment system 140 may be operable with or without the ASC catalyst 147. Further, although the ASC catalyst 147 is shown as a separate unit from the SCR catalyst 146 in FIG. 1, in some implementations, the ASC catalyst 147 may be integrated with the SCR catalyst 146, e.g., the ASC catalyst 147 and the SCR catalyst 146 may be located within the same housing. According to the present disclosure, the SCR catalyst 146 and the ASC catalyst 147 are positioned serially, with the SCR catalyst 146 preceding the ASC catalyst 147. As described above, in various other embodiments, the ASC catalyst 147 is not included in the exhaust aftertreatment system 140.

The controller 130 is structured to control, at least partly, the operation of the system 100 and associated sub-systems, such as the engine 120. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 130 is communicably coupled to the systems and components of FIG. 1, the controller 130 is structured to receive data from one or more of the components shown in FIG. 1. The structure and function of the controller 130 is further described in regard to FIG. 2.

As the components of FIG. 1 are shown to be embodied in the vehicle, the controller 130 may be structured as one or more vehicle electronic control units (ECUs). The controller 130 may be separate from or included with at least one of a transmission control unit, an exhaust aftertreatment control unit, a powertrain control module, an engine control unit or engine control module, etc. Thus, the controller 130 may comprise one or more microcontrollers. The controller 130 will be described in greater detail with reference to FIG. 2.

The system 100 may include an air pump 150. The air pump 150 may be, for example a pump configured to pump air from an external environment to the aftertreatment system 140. The air pump 150 may be, for example, a pump attached to the engine 120 or other component of the system 100 (e.g., the aftertreatment system 140). The air pump 150 may draw ambient from an environment external the system 100 or a component of the system 100. The air pump 150 may deliver moving air to one or more components of the aftertreatment system 140. For example, the air pump 150 may feed air to the aftertreatment system 140 upstream of the heater 141 and/or the reductant doser 145. In various embodiments, the air pump 150 may be positioned at one or more locations between an intake side of the engine 120 and an inlet of the aftertreatment system 140.

As shown, the system 100 may include one or more sensors 160. In some embodiments, the system 100 may include any number, placement, or type of sensors 160. The sensors 160 may include other sensors configured to acquire other data regarding the operation of the system 100 (e.g., operational data of the vehicle that embodies the system 100). Additional sensors may be also included with the vehicle. The sensors may include engine-related sensors (e.g., torque sensors, speed sensors, pressure sensors, flow-rate sensors, temperature sensors, etc.). The sensors 160 may further include sensors associated with other components of the vehicle/system, such as the aftertreatment system 140. In various embodiments, the sensors 160 may determine an amount of a substance or receive information/data regarding an amount of a substance in the aftertreatment system 140. For example, the sensors 160 may determine an amount of ammonia, NOx, $NO_2$, etc. in the aftertreatment system 140. The sensors 160 may be positioned at one or more locations in the aftertreatment system 140. For example, the sensors 160 may be placed at the SCR catalyst 146, the ASC catalyst 147, and/or the reductant doser 145. In various embodiments, the sensors 160 may be temperature sensors. The sensors 160 may be configured to determine or receive an air temperature, such as a temperature of air entering the engine 120 and/or air in the aftertreatment system 140. Temperature sensors 160 may be positioned at one or more locations in the system 100. For example, sensors 160 may be positioned at or proximate the engine 120 and at various locations within and/or proximate the aftertreatment system 140. For example, the sensors 160 may determine or receive a temperature of ambient air entering the system 100 through the air pump 150. In various embodiments, the sensors 160 may determine or receive a temperature of the air exiting the engine 120. In various embodiments, the sensors 160 may determine or receive a temperature of the exhaust gas in the aftertreatment system 140. For example, the sensors 160 may determine a temperature of the exhaust gas before and/or after entering and exiting the heater 141.

The sensors 160 may be real or virtual (i.e., a non-physical sensor that is structured as program logic in the controller 130 that makes various estimations or determinations). For example, an engine speed sensor may be a real or virtual sensor arranged to measure or otherwise acquire data, values, or information indicative of a speed of an engine of the powertrain (typically expressed in revolutions-per-minute). The sensor is coupled to the engine (when structured as a real sensor) and is structured to send a signal to the controller 130 indicative of the speed of the engine 120. When structured as a virtual sensor, at least one input may be used by the controller 130 in an algorithm, model, lookup table, etc. to determine or estimate a parameter of the engine (e.g., power output, etc.). Any of the sensors 160 described herein may be real or virtual.

The controller 130 is coupled, and particularly communicably coupled, to the sensors 160. Accordingly, the controller 130 is structured to receive data from one more of the sensors 160 and provide instructions/information to the one or more sensors 160. The received data may be used by the controller 130 to control one more components in the system 100 and/or for monitoring and thermal management purposes.

Referring to FIG. 2, a schematic diagram of the controller 130 of the system 100 of FIG. 1 is shown, according to an example embodiment. As shown in FIG. 2, the controller 130 includes at least one processing circuit 210 having at least one processor 212 and at least one memory or memory device 214. The controller 130 also includes an engine circuit 230, a heater circuit 240, a pump circuit 250, and an ammonia storage estimator circuit 260 each coupled to one another and the processing circuit 210. The controller 130 includes a communications interface 220. In various embodiments, one or more of the engine circuit 230, the heater circuit 240, the pump circuit 250, and the ammonia storage estimator circuit 260 may be embodied as hardware, software, and/or a combination of hardware and software.

In one configuration, one or more of the engine circuit 230, the heater circuit 240, the pump circuit 250, and the ammonia storage estimator circuit 260 is embodied as machine or computer readable media that stores instructions and that is executable by a processor, such as processor 212. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data or transmission of the data (i.e., trigger logic). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, one or more of the engine circuit 230, the heater circuit 240, the pump circuit 250, and the ammonia storage estimator circuit 260 is embodied as a hardware unit, such as separate and distinct electronic control units. As such, the one or more of the engine circuit 230, the heater circuit 240, the pump circuit 250, and the ammonia storage estimator circuit 260 may be embodied as one or more circuitry components including, but not limited to, processing circuitry, network interfaces, peripheral devices, input devices, output devices, sensors, etc. In some embodiments, one or more of the engine circuit 230, the heater circuit 240, the pump circuit 250, and the ammonia storage estimator circuit 260 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, one or more of the engine circuit 230, the heater circuit 240, the pump circuit 250, and the ammonia storage estimator circuit 260 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). One or more of the engine circuit 230, the heater circuit 240, the pump circuit 250, and the ammonia storage estimator circuit 260 may also include programmable hardware devices such as field programmable gate arrays, programmable array logic, programmable logic devices or the like. One or more of the engine circuit 230, the heater circuit 240, the pump circuit 250, and the ammonia storage estimator circuit 260 may include one or more memory devices for storing instructions that are executable by the processor(s) of one or more of the engine circuit 230, the heater circuit 240, the pump circuit 250, and the ammonia storage estimator circuit 260. The one or more memory devices and processor(s) may have the same definition as provided below with respect to the memory device 214 and processor 212. In some hardware unit configurations, one or more of the engine circuit 230, the heater circuit 240, the pump circuit 250, and the ammonia storage estimator circuit 260 may be geographically dispersed throughout separate locations in the vehicle/system relative to other components of the controller 130. Alternatively, and as shown, one or more of the engine circuit 230, the heater circuit 240, the pump circuit 250, and the ammonia storage estimator circuit 260 may be embodied in or within a single unit/housing, which is shown as the controller 130.

In the example shown, the controller 130 includes the at least one processing circuit 210 having the at least one processor 212 and the at least one memory device 214. The at least one processing circuit 210 may be structured or configured to execute or implement the instructions, commands, and/or control processes described herein with respect to one or more of the engine circuit 230, the heater circuit 240, the pump circuit 250, and the ammonia storage estimator circuit 260. The depicted configuration represents one or more of the engine circuit 230, the heater circuit 240, the pump circuit 250, and the ammonia storage estimator circuit 260 as instructions stored in non-transitory machine or computer-readable media. However, as mentioned above, this illustration is not meant to be limiting as the present disclosure contemplates other embodiments where one or more of the engine circuit 230, the heater circuit 240, the pump circuit 250, and the ammonia storage estimator circuit 260, or at least one circuit of one or more of the engine circuit 230, the heater circuit 240, the pump circuit 250, and the ammonia storage estimator circuit 260, is configured as a hardware unit. All such combinations and variations are intended to fall within the scope of the present disclosure.

The at least one processor 212 may be one or more of a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. In this way, the at least one processor 212 may be a microprocessor, a state machine, or other suitable processor. The at least one processor 212 also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the one or more of the engine circuit 230, the heater circuit 240, the pump circuit 250, and the ammonia storage estimator circuit 260 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The at least one memory device 214 (e.g., memory, memory unit, storage device) may include one or more devices (e.g., RAM, ROM, Flash memory, hard disk storage) for storing data and/or computer code for completing or facilitating the various processes, layers and modules described in the present disclosure. The at least one memory device 214 may be communicably connected to the at least one processor 212 to provide computer code or instructions to the at least one processor 212 for executing at least some of the processes described herein. Moreover, the at least one memory device 214 may be or include tangible, non-transient volatile memory or non-volatile memory. Accordingly, the at least one memory device 214 may include database components, object code components, script components, or any other type of information structure for supporting the various activities and information structures described herein.

The controller 130 may be configured to manage emissions for the system 100. In the example shown, the system 100 is embodied in a vehicle that is includes a diesel-fueled engine and a powertrain 108.

In various embodiments, the controller 130 may be configured to manage emissions of the system 100 by reducing cold start emissions. Cold start of the engine can refer to a condition of the system 100 during which a temperature of one or more components of the system 100, such as the aftertreatment system 140 (or one or more components thereof), is at or below a low temperature threshold. A cold start may correspond to a decreased temperature of the exhaust gas flowing through the aftertreatment system 140, which may reduce the efficacy of one or more catalysts. This results in higher unwanted emissions due to the catalyst (e.g., SCR catalyst 146) not operating as desired. Accordingly, reducing a cold start time (e.g., the duration of a cold start period of time) of the engine 120 may warm a catalyst, such as the SCR catalyst 146, of the aftertreatment system 140. The cold start of the engine 120 may be reduced during a predefined operating condition (e.g., duty cycle) of the engine 120 prior to starting the engine 120. "Starting" the engine can refer to beginning combustion of fuel in the engine 120. In various embodiments, starting the engine during cold start conditions occurs when the engine has been off for a predefined amount of time (e.g., more than one hour, more than 12 hours, etc.). Reducing a cold start of the engine 120 may include increasing a temperature of the air traveling through the aftertreatment system 140 prior to starting the engine 120, so there is a reduced amount of NOx in the aftertreatment system 140. The engine 120 may be turned on when a catalyst is ready (i.e., the air and/or the catalyst itself is at or above a predefined temperature). In various embodiments, reducing cold start emissions (e.g., exhaust gas emissions produced during a cold start) may additionally or alternatively occur when a state of charge (SOC) of the battery 105 is at or above a predefined limit.

In various embodiments, a gas heater, such as the heater 141, may be used to force air through the engine system of the system 100 to move heat from the heater 141 to the aftertreatment system 140. The heater circuit 240 may turn on the heater 141 and control an operation of the heater (e.g., activating the heater, deactivating the heater, increasing the temperature, decreasing the temperature, etc.). The moving air may come from motoring the engine 120. In various embodiments, the electric machine 110 may be used to motor the engine 120 to move the air through the engine 120 and the aftertreatment system 140. In various embodiments, the air from the engine 120 may be unheated until it reaches the heater 141. In various embodiments, the heater 141 may be positioned in or proximate the aftertreatment system 140 such that the air moves through the heater 141 and is heated prior to reaching the SCR catalyst 146 of the aftertreatment system 140. In various embodiments, moving air may come from a separate air source, such as via the air pump 150. The air pump 150 may pull ambient air directly from outside the engine system. In various embodiments, using the air pump 150 to move air may require less battery energy compared to using the electric machine 110 to generate moving air. Using less battery energy may correlate to carbon dioxide benefits (i.e., fewer $CO_2$ emissions). In various embodiments, the air pump used to generate air may be an EGR pump. Driving an EGR pump backwards may drive fresh air from an intake side of the engine 120 to the heater 141 and through the SCR catalyst 146. For example, an EGR pump may draw air from an intake manifold of the engine 120 to an exhaust manifold of the engine 120. In various embodiments, the air pump 150 may be a SCR pump that pumps heated air directly to the SCR catalyst 146.

In various embodiments, one or more sensors 160 may acquire data regarding a temperature value of the aftertreatment system 140. When a temperature value of the aftertreatment system 140 is at or above a first predefined threshold temperature and below a second predefined threshold temperature, the controller 130 may limit power of the engine 120. Alternatively or additionally, power of the engine 120 may be limited when a state of charge of the battery 105 is below a first threshold charge. When both (i) moving air is generated via the electric machine 110 and (ii) a temperature value of the aftertreatment system 140 is at or above a first predefined threshold temperature and below a second predefined threshold temperature, the controller 130 may cause the electric machine 110 to “crank” or “rotate” the engine 120. As used herein “crank” and “rotate” are used to describe an engine condition where one or more components of an engine, such as crankshaft, a flywheel, or other suitable engine component, is rotated. Cranking an engine typically involves using an electric machine, such as the electric machine 110, to rotate a crankshaft of the engine. The electric machine may be coupled to the crankshaft directly or indirectly (e.g., via a clutch, a drive shaft, and/or another component). In some embodiments, the electric machine is provided as an electric starter, a motor generator, or other suitable component. For example, the electric starter may “crank” or cause rotation of the crankshaft to facilitate starting the engine. In some embodiments, the electric machine may rotate the crankshaft via one or more intermediate components, such as a flywheel or flex plate. In some embodiments, causing an engine to rotate causes one or more other engine components to rotate or actuate. For example, causing an engine to rotate may cause one or more timing belts or camshafts to rotate and/or cause one or more valves (e.g., intake valves, exhaust values, etc.) or pistons to actuate.

In some embodiments, the electric machine 110 may rotate the engine 120 while there is no power generated by the engine 120 and there is no combustion occurring in the engine 120. In these embodiments, the engine 120 may not generate emissions, such as NOx. Rotation of the engine 120 while no power is generated by the engine 120 is referred to herein as “motoring.” In some embodiments, rotation or cranking of the engine is caused by the combustion of fuel within a combustion cylinder of the engine 120. Combustion of fuel within a combustion cylinder causes rotation of a crankshaft (e.g., via actuating a piston and a connecting rod). In some embodiments, the electric machine 110 may cooperate with a combustion process of the engine to rotate the engine 120. Thus, the engine 120 may be rotated by the electric machine 110, combustion of fuel within the engine, or both.

When moving air is generated via the air pump 150, the engine 120 may be cranked via the electric machine 110. The controller 130 may then cause the engine 120 to begin combustion of fuel and cause the air pump 150 to turn off. In various embodiments, the air pump 150 may be turned off by the controller 130 (i.e., pump circuit 250). In various embodiments, the controller 130 may cause the engine 120 to operate in a modified engine operating mode after starting the engine 120. The modified engine operating mode may be a limited power mode, where a power output of the engine 120 is limited to a predefined value. In some embodiments, the modified engine operating mode may be an optimized power level, where a power level of the engine 120 is at a predefined value corresponding to an optimal operating parameter of the system 100 (e.g., the vehicle). For example, the engine 120 may operate at an optimized power level to optimize NOx output (i.e., to be at or below a predefined level), fuel economy, etc. In some embodiments, the controller 130 may cause the engine 120 to operate in the limited power mode based on the temperature of the aftertreatment system 140 being at or below a predefined temperature threshold. In some embodiments, the controller 130 may cause the engine 120 to operate in the limited power mode for a predefined period of time. In some embodiments, the predefined period of time may begin at the beginning of an event, such as when the engine 120 is motored, when the air pump 150 is turned on, when the engine 120 is started, and/or at the beginning of another suitable event. For example, the controller 130 may start a timer (e.g., a device or virtual device, such as simulated device or software, that indicates that an interval of time has elapsed or that indicates an amount of time since and/or that measures an amount of time that elapses between its activation and deactivation) when the engine 120 is started. The controller 130 may cause the engine 120 to operate in the limited power mode until the timer indicates that the predefined period of time has elapsed. Thus, the timer may be used instead of or in combination with the temperature of the aftertreatment system 140 to limit engine power. In an example embodiment, the controller 130 may cause the engine 120 to operate in the limited power mode for the predefined period of time (e.g., 30 seconds, one minute, etc.) after the engine 120 is motored or the air pump 150 is turned on.

The controller 130 may determine that or receive an indication that the temperature value of the aftertreatment system 140 is at or above the second predefined threshold temperature. Based on the temperature value being at or above the second predefined threshold temperature, the engine 120 may be started by the controller (e.g., engine circuit 230). In various embodiments, a timer may be used to determine when the engine 120 is started. In an example operating scenario, the controller 130 receives a request to start the engine 120. Responsive to receiving the request, the controller 130 may determine one or more conditions of the system 100, such as whether a cold start condition is present. Responsive to determining that the cold start condition is present, the controller 130 start motoring the engine 120 and, in some embodiments, activates the heater 141. Responsive to receiving an indication that the temperature value of the aftertreatment system 140 is at or above the second predefined threshold temperature, and subsequent to the initial engine start request, the controller 130 may start the engine 120 and turn off the heater 141. As described above, in some embodiments, the controller 130 may cause the engine 120 to start in the limited power mode (e.g., when the temperature of the aftertreatment system 140 being at or below a predefined temperature threshold and/or during a predefined time period). In other embodiments, the controller 130 may cause the engine 120 to start in a "normal" operating mode (e.g., when the temperature value of the aftertreatment system 140 is at or above the second predefined threshold temperature). In various embodiments described herein a "normal" operating mode as used with respect to describing operation of an engine may refer to the engine 120 operating without modified output limitations, such as deactivated cylinders, limited power output, limited speed, and/or other modified engine operations. For example, when the engine 120 is operating in a normal operating mode, the engine 120 may operate with all cylinders active, without a power or speed limit, and/or without other modified engine outputs.

In still other embodiments, the controller 130 may cause the engine to change from the limited power mode to the normal operating mode (e.g., responsive to determining that the temperature value of the aftertreatment system 140 is at or above the second predefined threshold temperature). In some embodiments, the controller 130 may start the engine 120 in the normal operating mode after a predefined time period. The predefined time period may begin after beginning motoring the engine 120. In some embodiments, the controller 130 may turn off the heater 141 when the temperature value of the aftertreatment system 140 is at or above the predefined second threshold temperature, and/or after the predefined time period.

In various embodiments, the controller 130 may manage emissions by managing low ammonia storage, of the system 100 via a "shutdown" procedure of the engine 120. A "shutdown" procedure refers to an event where combustion of the engine 120 stops. In a hybrid vehicle, the vehicle may run via the battery 105 and/or the electric machine 110 when the engine 120 is shut down/shutting down. During a "normal" shutdown procedure, shutting down the engine may include stopping combustion in cylinders of the engine 120. Stopping combustion may include disabling a fuel system of the system 100 such that fuel is not delivered to the cylinders, closing an IAT valve such that air does not flow into an intake manifold (nor the cylinders), and/or disabling igniters such that an air/fuel mixture within the cylinders is not ignited (for spark-ignited engines). During the normal shutdown procedure, the engine 120 may continue to rotate for a brief period of time. For example, before enabling the shutdown procedure the engine 120 may be rotating at a certain speed (e.g., engine speed, rotational speed, etc.) and may continue to rotate after combustion has stopped due to inertia until friction brings the engine 120 to rest. In various embodiments, the controller 130 may receive a shutdown request. The shutdown request may include one or more of a key off, an engine stop button press, or another suitable shutdown request. In some embodiments, the controller 130 itself provides the shutdown request (e.g., when the controller 130 is provided in an autonomous driving vehicle). In some embodiments, the shutdown request is received from a computing system other than the controller (e.g., a remote computing system, an edge computing device, etc. Responsive to receiving the engine shutdown request, the controller 130 or engine circuit 230 may enable the shutdown procedure.

Ammonia storage in a catalyst (e.g., the SCR catalyst 146) may be a function of temperature. For example, as a temperature value increases, the ammonia storage capacity may decrease. In various embodiments, an amount of ammonia in the catalyst may be estimated by one or more sensors 160. The sensors 160 may be positioned at or proximate the catalyst. The controller 130 may manage low ammonia storage (e.g., replenish ammonia in the catalyst) responsive to determining, for example, via sensor data from the sensors 160, that the amount of ammonia in the catalyst is at or below a threshold. In various embodiments, the ammonia storage estimator circuit 260 may determine or estimate the amount of ammonia in the catalyst. The ammonia storage estimator circuit 260 may estimate the amount of ammonia stored in the catalyst based on a temperature value of the catalyst, one or more engine load values, and/or other information regarding the operation of the engine and/or the aftertreatment system. For example, the amount of ammonia stored in the catalyst may be a function of the temperature of the catalyst, an engine-out NOx (EONOx) value, and a dosing command value (e.g., an amount of ammonia dosed or provided into the aftertreatment system). In another example, ammonia storage estimator circuit 260 may estimate the amount of ammonia stored in the catalyst based on a look-up table (e.g., a 3D look-up table, etc.) that correlates the temperature value of the catalyst, one or more engine load values, and/or other information regarding the operation of the engine and/or the aftertreatment system with the amount of ammonia stored in the catalyst.

In various embodiments, ammonia storage may be replenished by lowering a temperature value of the SCR catalyst 146 and/or increasing an ammonia-to-NOx ratio (ANR). In various embodiments, a catalyst may be depleted of ammonia prior to shutting off the engine 120. When the engine 120 is turned back on, the catalyst may not be suited to efficiently convert NOx due to ammonia depletion (convert NOx at or above a predefined level, or conversion efficiency). Therefore, managing low ammonia storage via an engine shutdown may allow the catalyst to replenish ammonia and/or create a condition to replenish ammonia.

To manage low ammonia storage, an end of a drive cycle may be detected by the controller 130. A drive cycle may be a period of time in which the system 100 is on and operating. For example, a drive cycle may begin when a driver starts the engine and begins driving a route in the vehicle. The drive cycle may end when the driver ends the route and turns off the vehicle (e.g., by turning a key, pressing a button, and/or other suitable feature to turn off the engine). An end of a drive cycle may be, for example, the end of a route of the system 100, the end of a shift of a driver of the system 100, a destination of the system 100, or any other instance in which the engine 120 of the system 100 is or will be shut off. The controller 130 may detect a drive cycle end using, for example, a user input indicating an engine power off event (e.g., a user turning a key, pressing an engine power button). In some embodiments, the controller 130 may detect a drive cycle end based on, for example, a vehicle speed, GPS, lookahead information, etc. In various embodiments, the controller 130 may predict that a shutdown event will occur within a predetermined time period from a current time. In various embodiments, the engine 120 may be able to be shut down during a drive cycle if the system 100 is a series hybrid vehicle.

In some embodiments, the controller 130 may relax a shutdown condition of the engine 120 such that the engine 120 can be run during the shutdown procedure. For example, a load on the engine 120 may be reduced rather than shutting down the engine 120. In various embodiments, relaxing a shutdown condition of the engine 120 may relate to the controller 130 adjusting thresholds relating to the onset of a shutdown event. The thresholds may be adjusted such that a shutdown event is less likely to occur. For example, a shutdown event may occur a predetermined period of time after a driver/operator/user arrives at a destination. To relax a shutdown condition, the controller 130 may increase the length of the predetermined period of time. For example, the controller 130 may increase the length of the predetermined period of time from 5 minutes after the driver arrives at the destination until an engine shutdown event occurs to 30 minutes after the driver arrives at the destination until an engine shutdown event occurs. Therefore, the increase in the length of time may correspond to a lesser likelihood that the engine 120 is actually shut down. For example, if a driver arrives at a destination and begins a second route 25 minutes after arriving at the destination, the engine 120 may not shut down since the controller 130 configured the engine 120 to shut down 30 minutes after arrival at a destination instead of 5 minutes. In another example embodiment, to relax a shutdown condition of the engine 120, the controller 130 may reduce an idle load on the engine 120. During a "normal" idle period, the engine 120 may output a predefined amount of power. The power output by the engine 120 during the normal idle period may be sufficient to power one or more electronic components of the system 100, such as one or more compressors, one or more climate control devices (e.g., air conditioning systems, heaters, etc.), one or more pumps, and so on. When the controller 130 relaxes a shutdown condition of the engine 120, the controller 130 may reduce the power output by the engine 120 during the predefined period, such that the power output by the engine 120 during the predefined period is less than the power output by the engine 120 during the normal idle period.

The engine circuit 230 may initiate an engine shutdown procedure responsive to determining an end of a drive cycle, predicting a control decision to shut down, and/or relaxing the shutdown condition of the engine 120. In various embodiments, the engine shutdown procedure may involve lowering a load on the engine from, e.g., a predefined medium load value to a predefined low load value. The load operation may lower a temperature of the SCR catalyst 146. The load operation may also increase an ANR to replenish ammonia in a catalyst (e.g., SCR catalyst 146). After the engine circuit 230 initiates an engine shutdown procedure, the engine circuit 230 may shut down the engine completely. In a series hybrid vehicle, the vehicle may be shut off but the engine 120 may still be running. The driver may decide to key switch the vehicle off. Predicting a control decision to shut down may correspond to the driver opting to place the key switch in the vehicle in the off position. In various embodiments, if the driver does not key switch the vehicle off and the vehicle key switch is on (may also be actuation of a button or other ignition device), the engine may be able to be started and/or stopped during the drive cycle due to the series hybrid nature of the system 100. For example, if the system 100 is in a key switch on state, the engine 120 may be operated to replenish low ammonia storage even if the system 100 is off. If the system 100 is in a key switch off state, the engine 120 may be operated dependent upon an on state or an off state of the system 100.

In various embodiments, the controller 130 may manage low ammonia storage by managing operations of the engine 120. In various embodiments, an amount of ammonia in the catalyst may be estimated by one or more sensors 160. In various embodiments, the ammonia storage estimator circuit 260 may determine or estimate the amount of ammonia in the catalyst. The ammonia storage estimator circuit 260 may estimate the amount of ammonia stored in the catalyst based on a temperature value of the catalyst, one or more engine load values, and/or other information regarding the operation of the engine and/or the aftertreatment system. For example, the amount of ammonia stored in the catalyst may be a function of the temperature of the catalyst, an EONOx value, and a dosing command value (e.g., an amount of ammonia dosed or provided into the aftertreatment system).

Managing one or more operations of the engine 120 may keep a temperature of the SCR catalyst 146 below a predefined threshold. In various embodiments, managing operations of the engine 120 to keep the SCR catalyst temperature below a threshold may be enabled when the controller 130 determines that or receives an indication that a drive cycle is about to end (i.e., an end of the drive cycle is coming in a relatively short period of time). Managing operations of the engine 120 may include operating the engine at a low or relatively low load for an extended period of time.

The controller 130 may manage low ammonia storage via a catalyst preparation prior to starting the engine 120. In various embodiments, an amount of ammonia in the catalyst may be estimated by one or more sensors 160. In various embodiments, the ammonia storage estimator circuit 260 may determine or estimate the amount of ammonia in the catalyst. The ammonia storage estimator circuit 260 may estimate the amount of ammonia stored in the catalyst based on a temperature value of the catalyst, one or more engine load values, and/or other information regarding the operation of the engine and/or the aftertreatment system. For example, the amount of ammonia stored in the catalyst may be a function of the temperature of the catalyst, an EONOx value, and a dosing command value (e.g., an amount of ammonia dosed or provided into the aftertreatment system).

The catalyst may be a catalyst of the aftertreatment system 140. In various embodiments, ammonia can be replenished by dosing the reductant (e.g., via the reductant doser 145) prior to starting the engine 120. In order for ammonia to be replenished using this method, gas flow may be positive (i.e., move in a forward or downstream direction from the engine 120 to the aftertreatment system 140 and out of the system 100). A temperature of the air and/or exhaust gas flowing through the aftertreatment system 140 may need to be high enough to enable a decomposition of urea. In various embodiments, urea may decompose at temperatures at or above 170 degrees Celsius. To achieve a high enough temperature at or proximate the reductant doser 145 and/or SCR catalyst 146, the exhaust gas may be warm at a point proximate the reductant doser 145 and/or SCR catalyst 146. For example, the heater 141 may be positioned such that air/exhaust gas is heated at the proper location.

To prepare a catalyst of the aftertreatment system 140, air flow may need to be generated. In various embodiments, air flow may be generated by motoring the engine 120. The electric machine 110 may motor the engine 120. Motoring the engine 120 may increase the temperature of the exhaust gas. In various embodiments, air flow may be generated by a separate air source, such as air pump 150. In various embodiments, the air pump 150 may be positioned such that the air pump 150 feeds air to the aftertreatment system 140 upstream the heater 141 and the reductant doser 145.

The air generated by motoring the engine 120 or the air pump 150 may be heated to increase the air temperature. In various embodiments, the heater circuit 240 may activate the heater 141 and/or adjust operation parameters of the heater 141 to heat the air and increase the temperature. In various embodiments, engine actuators may increase air temperature if air flow is generated by motoring the engine 120 rather than using the air pump 150. An engine actuator may be, for example an EGR valve such as valve 125, an engine break, a compression break, variable valve phasing, an intake air temperature (IAT) sensor, a variable-geometry turbocharger (VGT), and/or a wastegate. For example, the EGR valve 125 may be activated by the engine circuit 230 to increase a temperature of air exiting the engine 120. Increasing a temperature of the engine-out air may be done without fueling the engine 120.

The controller 130 may activate or turn on the reductant doser 145 to begin dosing responsive to the air temperature value being at or above a decomposition limit. The decomposition limit may be the temperature at which urea decomposes. Sensors 160 may detect a temperature value of the air in the aftertreatment system 140 upstream of the reductant doser 145. The decomposition of urea may create additional ammonia to replenish the amount of ammonia in the aftertreatment system 140. In various embodiments, an ammonia storage model may determine or estimate an ammonia storage level of one or more components of the aftertreatment system 140 (e.g., the reductant doser 145). In various embodiments, injecting urea into exhaust gas at a certain temperature may give a desired breakdown of urea. The engine circuit 230 may start the engine 120 after ammonia storage levels are at or above a predefined threshold value. Sensors 160 may detect if the ammonia storage levels are at or above the predefined threshold value. In various embodiments, the threshold value maybe static (i.e., constant) or dynamic (i.e., ammonia storage levels change with respect to one or more variables). An ammonia storage model may determine or estimate the ammonia storage level based on, for example, an accumulated time that the air temperature is at or above the decomposition level, a mass of DEF, and/or a storage estimate (e.g., an estimation of a concentration of ammonia, etc.). An ammonia storage model may estimate an ammonia storage target based on a conversion efficiency target and the ANR. The ammonia storage model may determine or estimate how much to dose and at what temperature. In various embodiments, an ammonia-based storage model may be a physics-based model. The model may determine or estimate a target storage capacity of the catalyst (e.g., SCR catalyst 146). The storage capacity may be based on one or more of a conversion efficiency of ammonia in the aftertreatment system 140 and an ANR. For example, the model may receive information regarding ammonia slip (e.g., by how much the ammonia is slipping) and whether the catalyst is meeting a target conversion efficiency. Based on this data, the model may determine or estimate how much to dose the catalyst and at what temperature. In various embodiments, the dosing temperature may be a value at which a catalyst can store the greatest amount of ammonia. In various embodiments, the temperature may be between 200 and 275 degrees Celsius. In various embodiments, the ammonia storage model may determine a location of the catalyst that is filled (e.g., a front zone and/or a back zone) and/or how much the catalyst is filled.

In various embodiments, the controller 130 may manage low ammonia storage by limiting an engine-out NOx value during an engine start. In various embodiments, the engine 120 may not be mechanically coupled to an output of the powertrain 108. As a result, operation of the engine 120 may be manipulated to limit engine-out NOx (e.g., decrease NOx levels). Operation of the engine 120 may be manipulated to limit NOx levels until it is determined that, or an indication is received that a conversion efficiency of the SCR catalyst 146 is high or at or above a predefined threshold. To limit engine-out NOx, the engine circuit 230 may turn on the engine 120. The ANR may be increased by increasing an amount of ammonia relative to an amount of NOx. Increasing the amount of ammonia relative to the amount of NOx may be done by, for example, reducing NOx (e.g., by changing an engine operating mode or shutting down the engine) or increasing ammonia (e.g., by dosing more DEF). Subsequent to or simultaneous with increasing the ANR, engine-out NOx may be limited. In various embodiments, the engine limit may be dynamic (i.e., continuously changes over time) or static. Engine-out NOx may be limited by, for example, limiting the power of the engine 120, lowering a combustion temperature of the engine 120, operating at a high EGR, and/or operating at a high AFR. In various embodiments, the engine circuit 230 may limit operations of the engine 120. The sensors 160 may detect ammonia storage levels in the aftertreatment system 140 and communicate the levels to the controller 130. The engine circuit 230 may disable the operations that limit the engine-out NOx responsive to the sensors 160 communicating to the controller 130 that ammonia storage levels are at or above a predefined threshold limit. In various embodiments, the sensors 160 may determine or estimate ammonia storage levels based on, for example, an accumulated time that the engine 120 is limiting engine-out NOx, a mass of DEF, and/or a storage estimate (e.g., an estimation of a concentration of ammonia, etc.).

The controller 130 may manage emissions of the vehicle by managing ammonia slip. Ammonia slip may refer to unreacted ammonia exiting the aftertreatment system 140 as a pollutant. Ammonia slip may be addressed by temporarily increasing engine-out NOx levels. When ammonia reacts with NOx, the amount of ammonia in the aftertreatment system may decrease, thus preventing ammonia slip or ammonia slip amounts above a predefined threshold. Ammonia slip may occur when the ANR is at or above a predefined threshold and/or when temperature values are at or below a predefined threshold. In various embodiments, the engine 120 may not be mechanically coupled to a powertrain 108 output. Therefore, operations of the engine 120 may be manipulated to reduce ammonia slip. The capacity of the catalyst (e.g., how much ammonia can be stored in SCR catalyst 146) may be a function of temperature. For example, as temperature increases, the capacity may decrease.

In various embodiments, the controller 130 may determine that or receive an indication that ammonia slip is likely to occur within an upcoming predefined horizon, which may be time-based (e.g., thirty seconds, three minutes, one-hour, etc.) and/or distance based for a vehicle (e.g., five-hundred feet, one-mile, etc.). The controller 130 may determine ammonia slip is likely to occur by, for example, determining that the ANR is at or above a predetermined threshold amount. Responsive to determining ammonia slip is likely to occur, the engine circuit 230 adjusts operation of the engine 120 to generate higher engine-out NOx levels. For example, the engine circuit 230 may operate the engine 120 with an increased level of power or decrease exhaust gas recirculation (EGR). Other low-level engine control actuations may be performed to increase engine-out NOx levels. The increased amount of NOx generated by the engine 120 may react with redundant ammonia in the aftertreatment system 140, which may also mitigate ammonia slip. In various embodiments, the engine 120 may not be run at an optimal level of operation to improve fuel economy (i.e., operating at a specific engine speed for a corresponding engine power demand). In various embodiments, the engine 120 may be operated at conditions away from optimal condition parameters.

Ammonia slip may also be addressed by temporarily decreasing the ANR. In various embodiments, the ammonia storage estimator circuit 260 may include a sensor 160 embedded in one or more components of the aftertreatment system 140. For example, a sensor 160 may be positioned on or proximate to the reductant doser 145. The ammonia storage estimator circuit 260 may determine and/or receive data to determine an amount of ammonia in one or more components of the aftertreatment system. Ammonia storge may be estimated as a function of temperature, engine-out NOx (EONOx), SONOx, and/or a dosing amount. An amount of ammonia in a component of the aftertreatment system may be proportional to a temperature value of the component. Therefore, at a known temperature, an amount of ammonia can be estimated, and an amount of ammonia downstream of the ammonia storage estimator circuit 260 and/or component may also be estimated. In various embodiments, ammonia sensed downstream of the component may indicate that the component is saturated with ammonia and additional ammonia has left the component. The ammonia storage estimator circuit 260 may measure one or more variables (e.g., temperature, EONOx, SONOx, ammonia to fuel ration, dosing amount, etc.) and input the variables into a model. The model may output an estimated ammonia storage level based on the measured variables. In various embodiments, a rapid or steady change in temperature may indicate ammonia slip is occurring or has occurred.

In various embodiments, the controller 130 may decrease the ANR responsive to a determination by the ammonia storage estimator circuit 260 that ammonia slip is occurring (i.e., an ammonia slip amount that is above a predefined level/threshold). The ANR may be decreased by decreasing a dosing amount (e.g., decreasing an amount of DEF dosed). The decreased ANR may compensate for a release of ammonia by the SCR catalyst 146.

Ammonia slip may also be addressed by limiting one or more of an exhaust gas temperature and/or a catalyst gas temperature (e.g., gas temperature in SCR catalyst 146). The exhaust gas temperature and/or catalyst gas temperature may be limited by limiting power of the engine 120. For example, the engine circuit 230 may control the engine 120 to reduce generated power. In various embodiments, deactivating fueling in the engine 120 may limit an exhaust gas temperature. For example, limiting fueling in one or more cylinders of the engine 120 may decrease a temperature of air exiting the engine 120 and subsequently entering the aftertreatment system 140. In various embodiments, motoring the engine 120 may limit a temperature of the exhaust gas. The electric machine 110 may motor the engine 120. For example, motoring the engine 120 may cause fresh air to enter through or into a catalyst of the aftertreatment system 140. Fresh air may be at a lower temperature than air currently in the aftertreatment system 140, so cooler air entering may lower the overall temperature of the air in the aftertreatment system 140. In various embodiments, limiting a temperature of an exhaust gas and/or a catalyst gas may include modulating power of the engine 120 to limit a rate of change of the catalyst temperature. This may reduce a rate of change of the ammonia storage capacity, which may slow ammonia slip and increase a likelihood of managing ammonia slip via the ANR.

In various embodiments, emissions of a vehicle may be managed via thermal management. In certain aftertreatment system conditions, NOx may be formed by the in the aftertreatment system 140. For example, relatively higher temperatures (e.g., greater than 350° C.) in the aftertreatment system 140 alone or in combination with one or more other conditions, such as an ammonia slip condition, transient temperature conditions, etc., may result in NOx forming in the aftertreatment system, specifically across the ammonia slip catalyst (ASC) 140. The phenomenon of NOx formation in the aftertreatment system 140 is referred to as "NOx remake." may occur at high temperatures. Therefore, reducing an outlet temperature of the SCR catalyst 146 may reduce NOx remake.

In various embodiments, the engine circuit 230 may turn off the engine 120. Low speed motoring of the engine 120 may be performed by the electric machine 110 to reduce a temperature of the engine 120. Motoring the engine 120 at a low speed may increase a convection heat transfer and reduce the temperature of the engine 120 in a short period of time. A sensor 160 positioned at or proximate the engine 120 may determine or receive a temperature value of the engine 120. The engine circuit 230 may turn on the engine 120 when it is determined that, or an indication is received that the temperature value of the engine 120 is at or below a predefined threshold temperature and/or a state of charge of the battery 105 is below a predefined state of charge threshold. In various embodiments, this may be similar to limiting the exhaust gas and/or catalyst gas temperature described above.

In various embodiments, the engine circuit 230 may operate the engine 120 at lower loads (e.g., at an engine load value below a predefined threshold, an engine power value below a predefined threshold, an engine speed value below a predefined threshold, etc.) with a lower turbine outlet temperature (TOT) (e.g., at a TOT value below a predefined threshold) and/or exhaust gas temperature (e.g., a target exhaust gas temperature below a predefined threshold) relative to a current or baseline (e.g., normal) load. Operating the engine 120 at a lower load (e.g., below the load threshold) with a lower exhaust gas temperature (e.g., below a target exhaust gas temperature) may reduce a temperature of the SCR catalyst 146. In various embodiments, the sensors 160 may be temperature sensors configured to determine or receive a temperature value of the SCR catalyst 146. The engine circuit 230 cause the engine 120 to operate in a normal operating mode when the temperature value of the SCR catalyst is at or below a predefined threshold temperature and/or a state of charge of the battery 105 is below a predefined threshold value.

Figure 3:
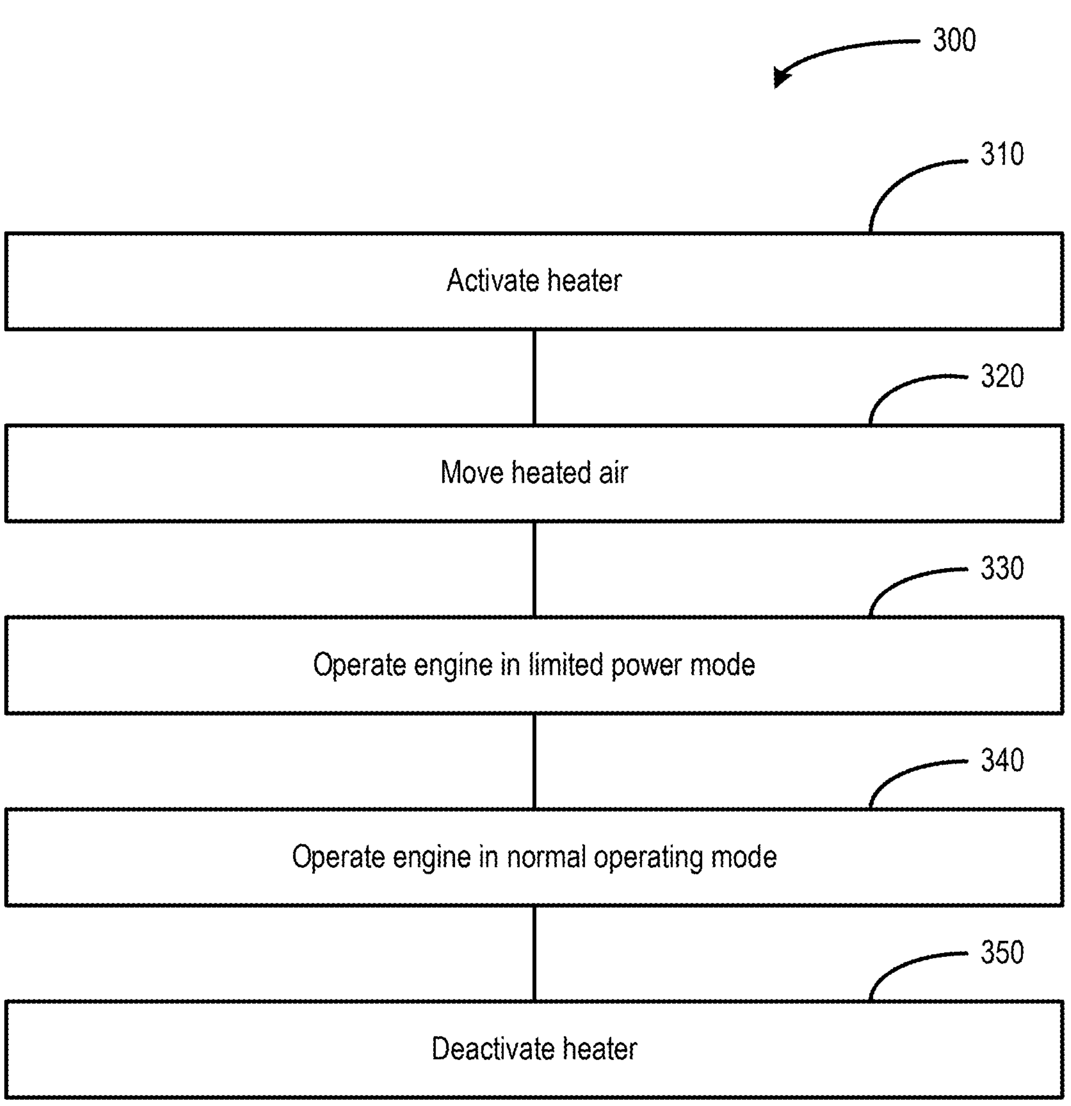
FIG. 3 is a flowchart showing a method of managing emissions by reducing cold start emissions, according to an exemplary embodiment.

Referring now to FIG. 3, a method 300 for managing emissions is shown, according to an exemplary embodiment. In various embodiments, the method 300 includes managing, by the controller 130, emissions generated by the engine 120 via a cold start emissions reduction strategy. In various embodiments, the cold start emissions reduction strategy may be used to reduce cold start emissions when starting the engine 120 during cold start conditions. For example, before the system 100 is used for a mission (e.g., a power generation mission, a driving mission, etc.), the engine 120 may be started while cold start conditions are present. In various embodiments, the controller 130 may reduce a cold start NOx emissions value by warming a catalyst during a duty cycle prior to starting the engine, and/or when a battery SOC is at or above a predefined threshold value. In various embodiments, the controller 130 may activate the heater 141 via the heater circuit 240 to reduce cold start emissions. The heater 141 may be a gas heater. To reduce cold start emissions via a gas heater, The controller 130 may force air through the system (i.e., system 100) to transport heat from the heater 141 to the rest of the aftertreatment system 140. Air may be forced through the system in a variety of ways. For example, the controller 130 may control the electric machine 110 via the engine circuit 230 to motor the engine 120 to move heated air through the aftertreatment system.

For example, a separate air source, such as the air pump 150, may be used to pull air from outside of the system. The pump circuit 250 of the controller 130 may control the air pump 150. In various embodiments, using a separate air pump 150 may utilize less battery energy.

At process 310, the controller 130 turns the heater 141 on. In some embodiments, the controller turns on the heater 141 responsive to a battery state of charge of the system 100 being at or above a predefined threshold. In some embodiments, the heater 141 may be turned on prior to the engine 120 being fired.

At process 320, the controller 130 causes heated air to be moved. In various embodiments, the controller 130 causes an air mover to move the heated air. In various embodiments, the controller 130 may cause heated air to be moved by motoring the engine 120. Motoring the engine 120 may be performed via a motor generator (i.e., the electric machine 110 of FIG. 1). In various embodiments, heated air may be moved by turning on or activating an air pump (i.e., the air pump 150 of FIG. 1). One or more circuits of the controller 130 may cause the heated air to be moved. For example, the engine circuit 230 may cause the engine 120 to be motored, and the pump circuit 250 may turn on the air pump 150.

At process 330, the controller 130 limits engine power. In various embodiments, the controller 130 causes the engine 120 to operate in a limited and/or modified power mode responsive to a temperature of the aftertreatment system 140 being at or above a predefined first threshold temperature but below a predefined second threshold temperature. Operating in a limited power mode may include, for example, operating the engine 120 at a lesser or lower load relative to a normal or standard load. In various embodiments, the controller 130 may limit engine when a timer (i.e., a length of time) is at or above a predefined first threshold time but below a predefined second threshold time. Additionally or alternatively, the controller 130 may cause the engine 120 to operate in a power mode that is optimized for NOx and enthalpy responsive to a battery SOC being below the predefined threshold value. In various embodiments, the controller 130 may cause the engine 120 to operate in a limited power mode while operating the engine 120 in lower NOx regions. In various embodiments, the controller 130 may cause the engine 120 to operate in a limited power mode by limiting the amount of fuel provided to the engine 120 and/or limiting the amount of air provided to the engine 120. In some embodiments, the controller 130 may cause the engine 120 to operate in a limited power mode responsive to heated air being moved by motoring the engine at process 320. In various embodiments, when the controller 130 causes the engine 120 to operate in a limited power mode, the controller 130 may also deactivate the air pump 150, subsequent to process 320.

In various embodiments, at process 330, the controller 130 may alternatively or additionally cause the engine 120 to operate at an optimized power level. An optimized power level may be a mode, state, operating condition, etc. in which the engine 120 is operated such that one or more desired operating parameters are met that cause the system 100 (e.g., vehicle) to operate to improve performance of the engine 120, the system 100 (e.g., vehicle), and/or any other components of the system 100, relative to a previous or normal performance. Meeting the desired operating parameters may correspond to an "optimization." For example, the controller 130 may cause the engine 120 to operate such that fuel economy is optimized (e.g., fuel economy improves relative to a previous fuel economy level), NOx generation is optimized, etc.

In various embodiments, the controller 130 may cause the engine 120 to operate such that the power output of the engine 120 is below a predefined threshold value. Operating the engine 120 at a lower load relative to a normal load may, in some embodiments, cause a turbine out temperature value to be lower relative to a normal or standard turbine out temperature value (e.g., a predetermined threshold value).

At process 340, the controller 130 operates the engine 120 in a normal operating mode. A normal operating mode may be an operating mode in which the engine 120 operates without modified output limitations. In various embodiments, the controller 130 may cause the engine 120 to operate in the normal operating mode responsive to determining that the temperature value of the aftertreatment system is at or above the second predefined threshold temperature. In various embodiments, the controller 130 may turn on the engine 120 responsive to determining that the timer is at or above the second predefined threshold time.

In various embodiments, operating the engine 120 in the normal or normal operating mode may cause the power output of the engine to be at a power output threshold value. The controller 130 may operate the engine 120 in the normal mode responsive to one or more of the temperature of a catalyst being below a predetermined temperature threshold value or a state of charge being below a predetermined state of charge threshold value.

At process 350, the controller 130 deactivates or turns off the heater 141. In various embodiments, the controller 130 may turn off or deactivate the heater 141 responsive to determining that the temperature value of the aftertreatment system is at or above the second predefined threshold temperature. In various embodiments, the controller 130 may turn off the heater 141 off responsive to determining that the timer is at or above the second predefined threshold time.

In an example operating scenario, the method 300 may be used to reduce cold start NOx by warming up a catalyst, such as the SCR catalyst 146, prior to starting the engine 120 when a SOC of the battery 105 is above a predefined threshold. In some embodiments, the catalyst may be warmed with the heater 141. In some embodiments, air is forced through the system to transport the heat from the heater 141 to the aftertreatment system 140, including the SCR catalyst 146.

In some embodiments, the controller 130 may cause the engine 120 to motor using the electric machine 110. Motoring the engine 120 may cause the heated air to move through the aftertreatment system 140, thereby warming the aftertreatment system 140.

In some embodiments, the controller 130 may cause the air pump 150 to pull air from outside the system 100, past the heater 141, and into the aftertreatment system 140. Advantageously, the air pump 150 may use less battery energy compared to motoring the engine 120, resulting in lower energy usage and/or reduce emissions output for the same energy usage.

In an example operating scenario, the method 300 includes activating, by the controller 130, the heater 141 (e.g., during a cold start event. In some embodiments, the controller 130 may motor the engine 120, activate air pump 150, or both. In some embodiments, when the controller 130 determines that (i) the temperature of the aftertreatment system 140 is at or above a first threshold and below a second threshold, (ii) a predefined period of time has elapsed, and/or (iii) a SOC of the battery 105 is below a corresponding threshold, the controller 130 may start the engine. In some embodiments, the controller 130 may start the engine 120 in a limited power mode. In some embodiments, the controller 130 may start the engine 120 in a normal operating mode (e.g., by cranking the engine using the electric machine 110 and starting combustion of fuel in the engine 120). The controller 130 may also deactivate the air pump 150. In some embodiments, when a temperature of the aftertreatment system 140 is greater than the second threshold and/or when a second predefined time period has elapsed, the controller 130 may start the engine in a normal operating mode. In some embodiments, when a temperature of the aftertreatment system 140 is greater than the second threshold and/or when a second predefined time period has elapsed, the controller 130 may deactivate the heater 141.

Referring to the above-described example, determining, by the controller 130, that the SOC of the battery 105 is below a corresponding threshold may be based on one or more operating characteristics of the battery 105, the aftertreatment system 140, and/or an amount of time that the heater 141 has been active. While the heater 141 is active, the heater 141 can consume battery energy long enough causing SOC drop below a predefined threshold. Thus, the controller 130 may compare a current SOC of the battery to a SOC reference value (e.g., a threshold value). In some embodiments, when the temperature of the aftertreatment system 140 is below a predefined threshold, the controller 130 is operable to start the engine 120 based on the SOC of the battery being at or below a modified SOC reference value. The modified SOC reference value may be the SOC reference value plus a predefined amount (e.g., two percent of the SOC reference value), such that the modified SOC reference value is greater than the SOC reference value. reference+2%. A model-based calculation can be used to modify the SOC reference value. In other embodiments, when the temperature of the aftertreatment system 140 is above a predefined threshold, the controller 130 is operable to start the engine 120 when the SOC of the battery 105 is at or below the SOC reference value.

Figure 4:
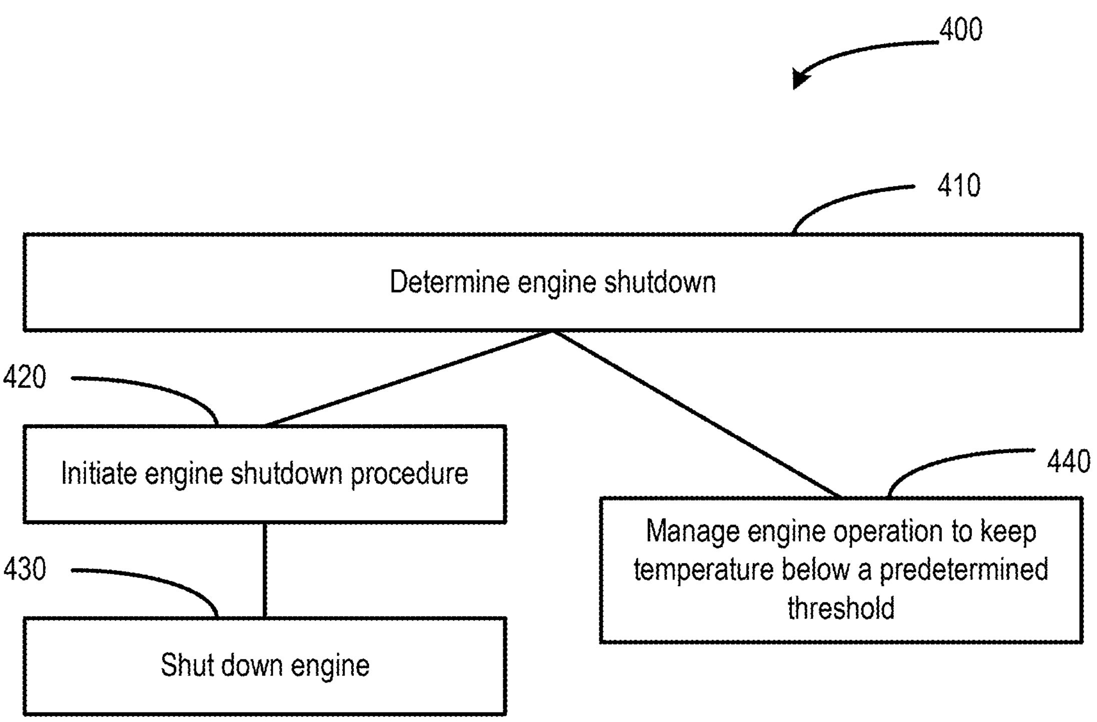
FIG. 4 is a flowchart showing a method of managing a low ammonia storage via a shutdown procedure, according to an exemplary embodiment.

Referring now to FIG. 4, a method 400 for managing low ammonia storage via a shutdown procedure is shown, according to an exemplary embodiment. In various embodiments, ammonia storage may be replenished by lowering a temperature of the SCR and/or increasing an ammonia to NOx ratio (ANR).

At process 410, an upcoming engine shutdown event is determined by the controller 130. In various embodiments, the controller 130 may receive an indication that an engine shutdown event is upcoming. In various embodiments, the controller may detect an end of a drive cycle or receive an indication of an end of a drive cycle. In various embodiments, the end of a drive cycle corresponds to an upcoming engine shutdown event. In various embodiments, the end of the drive cycle may be determined using, for example, a vehicle speed, GPS data, and/or lookahead information. For example, a vehicle speed at or below a predetermined threshold for a predetermined period of time may correspond to an upcoming engine shutdown event. In another example, GPS data indicating that a vehicle is at a destination may correspond to an upcoming engine shutdown event. In various embodiments, an upcoming engine shutdown event may be determined by predicting a control decision to shut down the engine. The controller 130 may predict a control decision by determining, for example, that a route will end in a predetermined distance, and predicting that the engine 120 will shut down when the end of the route is reached. In a series hybrid vehicle, an engine may shut down during a drive cycle. For example, the engine 120 of the system 100 may shut down while the system 100 is in the middle of a route, and the battery 105 may power the system 100. In various embodiments, the prediction of a control decision may be replaced by relaxing a shutting down condition so the engine may be run extended during the shutdown procedure. For example, rather than the controller 130 initiating a shutdown procedure, the engine 120 may continue to run.

After process 410, the method 400 may perform one of two processes. In various embodiments, the method 400 may proceed to process 420. At process 420, the controller 130 initiates an engine shutdown procedure. In various embodiments, the engine shutdown procedure may involve low and/or medium load operation to lower the SCR temperature and/or increase the ANR to replenish ammonia in the catalyst.

Responsive to the method 400 performing process 420, the method 400 may proceed to process 430. At process 430, the engine is shut down responsive to one or more of the SCR temperature being below a predefined threshold and/or the ANR being at or above a predefined threshold.

In various embodiments, after process 410, the method 400 may proceed to process 440 instead of process 420 (and subsequently process 430). At process 440, the controller 130 manages operation of the engine 120. In various embodiments, the controller 130 may operate the engine 120 to keep a temperature of the SCR catalyst 146 below a predefined threshold value. In various embodiments, the controller 130 may operate the engine 120 at or proximate a time when a drive cycle is expected to end. In various embodiments, keeping a temperature of the SCR catalyst below the predefined threshold value may be achieved by operating the engine 120 at a lower load for an extended period of time.

In an example operating scenario, the method 400 is used to replenish ammonia storage by lowering a temperature of the SCR catalyst 146 and increasing ANR (Ammonia-NOx ratio).

In some embodiments, the controller 130 detects a drive cycle end (e.g., using vehicle speed, GPS, look-ahead information, etc.) and/or predicts control decision to shut down the engine 120. For example, the engine 120 can shut down during the drive cycle. The prediction of control decision can be replaced by relaxing the shutting down condition such that the engine 120 can be run during the shut down procedure. Responsive to relaxing the shut down condition, the controller 130 may initiate an engine shut down procedure involving reducing the load (e.g., the power output, the speed, etc.) of the engine below a predefined threshold in order to lower the temperature of the SCR catalyst 146 and increase the ANR to replenish ammonia in the SCR catalyst 146. The controller 130 may shut down engine 120 responsive to determining that the ANR has increased (e.g., relative to a previous ANR value occurring before the drive cycle end or the control decision to shown down the engine 120.

In some embodiments, the controller 130 may adjust the operation of the engine 120 to maintain a temperature of the SCR catalyst 146 below a predetermined threshold. In some embodiments, the controller 130 can adjust the operation of the engine 120 when the drive cycle is expected to end. Adjusting the operation of the engine 120 may include operating the engine 120 at a load (e.g., power output, speed, etc.) below a predefined threshold for a predefined period of time.

Figure 5:
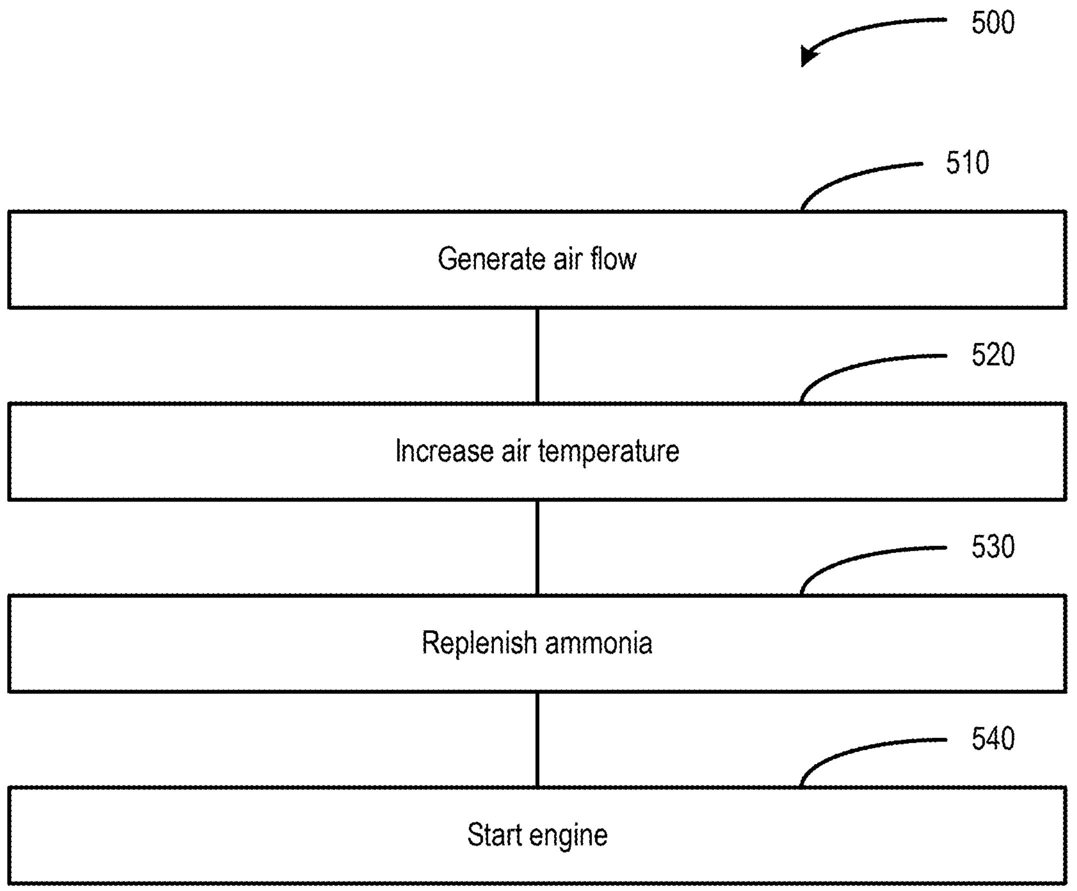
FIG. 5 is a flowchart showing a method of managing a low ammonia storage via a catalyst preparation prior to turning on an engine, according to an exemplary embodiment.

Referring now to FIG. 5, a method 500 is shown for managing low ammonia storage via a catalyst preparation prior to starting the engine. In various embodiments, the DEF may be dosed (e.g., via the reductant doser 145) prior to starting the engine 120. Dosing the DEF (e.g., via the reductant doser 145) may replenish ammonia in one or more components of the aftertreatment system 140. In various embodiments, dosing the DEF (e.g., via the reductant doser 145) may be effective when a gas flow is positive and/or has a high enough temperature to enable a decomposition of urea. In various embodiments, the temperature may be at or above 170 degrees Celsius.

At process 510, the controller 130 generates an airflow responsive to determining that an ammonia level in the aftertreatment system 140 is below a predefined threshold. In various embodiments, the controller 130 may control the electric machine 110 to motor the engine 120 and generate air flow. In various embodiments, a separate air source (i.e., the air pump 150) may generate air flow. The air pump may feed air upstream of the heater 141 and the reductant doser 145, as shown in FIG. 1.

At process 520, the controller 130 increases air temperature. In various embodiments, air temperature may be increased by turning on a heater (e.g., a gas heater, heater 141, etc.). In various embodiments, an engine actuator may increase the air temperature responsive to air flow being generated by motoring the engine 120 at process 510. In various embodiments, an engine actuator may be an EGR valve and/or an engine break. In various embodiments, an engine actuator may be activated to increase an out temperature of the engine 120 without fueling.

At process 530, ammonia is replenished. In various embodiments, DEF dosing may be turned on or activated at reductant doser 145 to replenish ammonia in the aftertreatment system 140. In various embodiments, the reductant doser 145 may be turned on responsive to the air temperature reaching a temperature at or above a decomposition limit of urea (e.g., 170 degrees Celsius).

At process 540, the controller 130 starts the engine 120. In various embodiments, the engine 120 may be started responsive to determining that ammonia storage levels have reached a target value. In various embodiments, the target value may be based on, for example, an accumulated time, a DEF mass, and/or a storage estimate.

In an example operating scenario, the method 500 can be used to replenish ammonia by dosing DEF prior to starting the engine 120. In some embodiments, the controller 130 may dose DEF prior to starting the engine 120 when a flow rate of air flowing through the aftertreatment system 140 is above a predefined air flow rate threshold and when a temperature of the aftertreatment system 140 (or a component thereof) is above a predefined temperature threshold (e.g., 170° C.) such that urea decomposition is possible in the aftertreatment system 140.

In some embodiments, the controller 130 may motor the engine 120 (e.g., using the electric machine 110) and/or activate the air pump 150 to cause the flow rate of air flowing through the aftertreatment system 140 to be above a predefined air flow rate threshold. In some embodiments, the controller 130 may increase the temperature of the aftertreatment system 140 by activating the heater 141 and/or, if the engine 120 is motoring, cause one or more engine actuators, such as an EGR valve, an engine break, etc. to increase engine out temperature, without fueling the engine 120.

In some embodiments, the controller 130 may activate the reductant doser 145 responsive to determining that (i) the flow rate of the air flowing through the aftertreatment system 140 is above the predefined air flow rate threshold and/or (ii) the temperature of the aftertreatment system 140 (or a component thereof) is above the predefined temperature threshold. The controller 130 may start the engine 120 responsive to determining that the ammonia storage levels are at or above a predefined threshold, based on an amount of time the reductant source has been active, an amount (e.g., mass, volume, etc.) of reductant provided by the reductant doser 145, and/or an estimate of reductant in the aftertreatment system 140.

Figure 6:
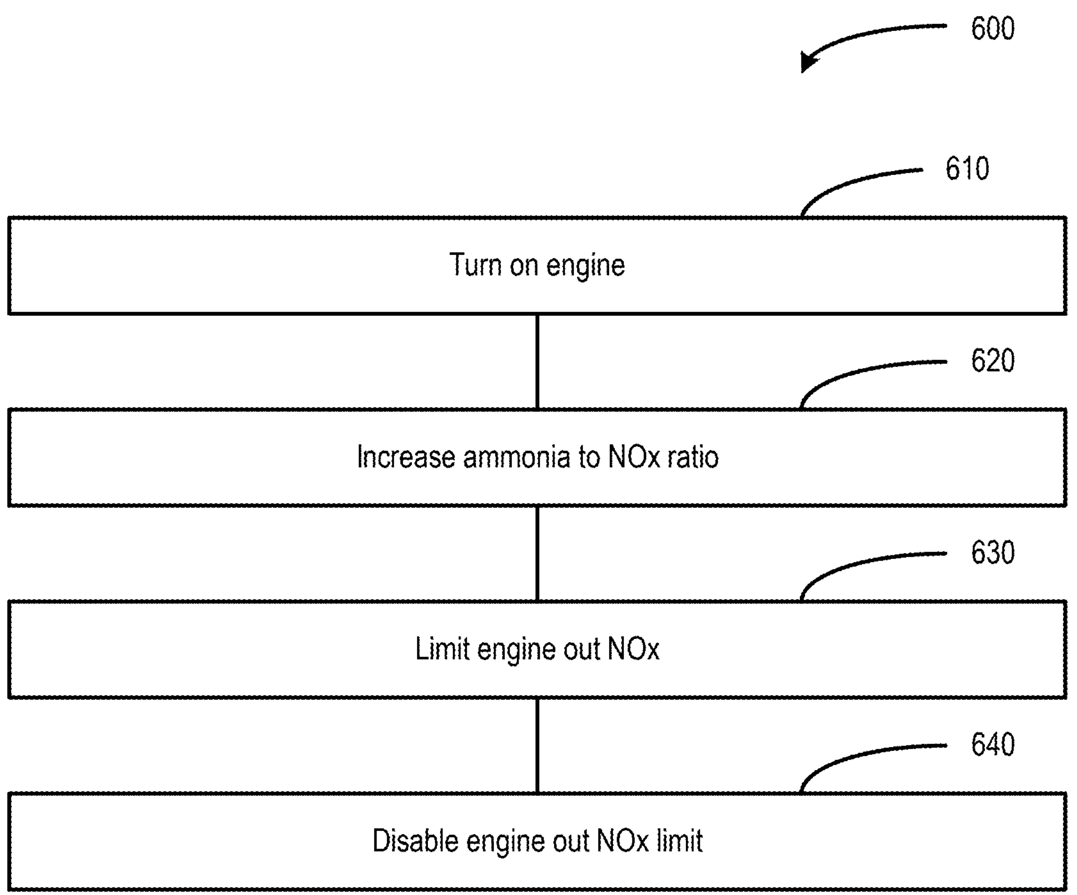
FIG. 6 is a flowchart showing a method of managing a low ammonia storage via limiting engine-out NOx during start, according to an exemplary embodiment.

Referring now to FIG. 6, a method 600 for managing low ammonia storage by limiting engine-out NOx during an engine start. In various embodiments, the engine 120 may not be mechanically coupled to a powertrain 108 output of the system 100. This may allow the controller 130 to operate the engine 120 such engine out NOx can be limited until a conversion efficiency of the SCR catalyst 146 is at or above a predefined threshold.

At process 610, the controller 130 turns on the engine 120 responsive to determining that ammonia storage in one or more components of the aftertreatment system is below a predefined threshold value.

At process 620, the ammonia to NOx ratio (ANR) is increased. Increasing the ANR may subsequently increase an amount of ammonia in a catalyst or other component of the aftertreatment system 140. The ANR may be increased, for example, by activating reductant doser 145 to dose reductant into the aftertreatment system 140, thereby increasing the amount of ammonia in the aftertreatment system 140.

At process 630, the controller 130 operates the engine 120 to limit engine out NOx. In various embodiments, engine out NOx may be limited by, for example, limiting power, and/or lowering a combustion temperature.

At process 640, the controller 130 disables the engine limit of process 630. In various embodiments, the limit may be disabled responsive to the controller 130 determining that ammonia storage levels are at or above the predefined threshold. In various embodiments, the threshold may be based on, for example, an accumulated time, a DEF mass, and/or a storage estimate.

In an example operating scenario, the method 600 may be used to mitigate low ammonia storage by limiting EONOx during an engine start event. In a series hybrid powertrain, such as the powertrain 108, the engine 120 is not mechanically coupled to the powertrain output. Thus, the operation of the engine 120 can be manipulated to limit engine out NOx until a SCR conversion efficiency is above a predefined threshold (e.g., when a temperature of the SCR catalyst 146 is above a predefined threshold). In some embodiments, the controller 130 may start the engine 120. Subsequent to starting the engine 120, the controller 130 may increase the ANR in the aftertreatment system 140 (e.g., by causing the reductant doser 145 to dose reductant into the aftertreatment system 140). The controller 130 may limit engine out NOx by at least one of limiting a power output of the engine 120 or lowering a combustion temperature in the engine 120. The controller 130 may disable the engine out NOx limit after ammonia storage levels are at or above a predefined threshold.

Figure 7:
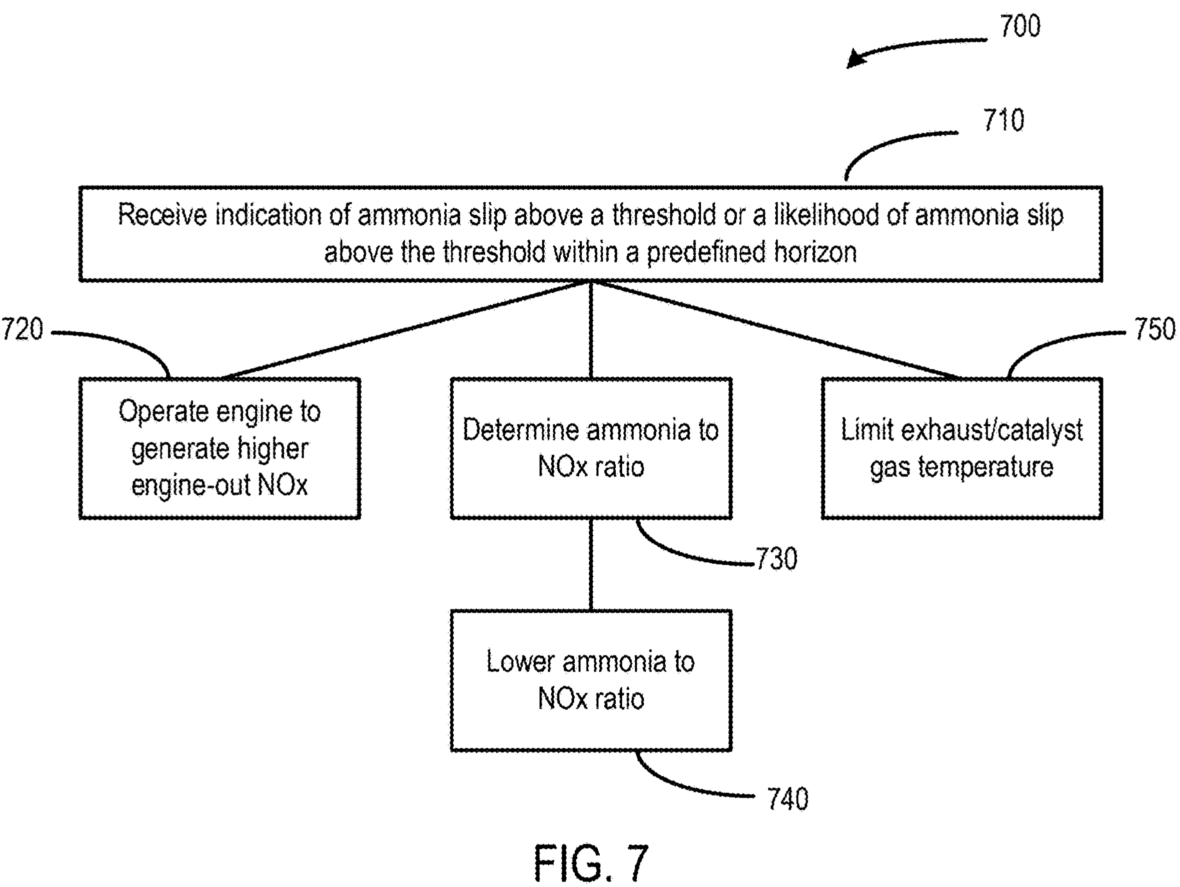
FIG. 7 is a flowchart showing a method of ammonia slip management, according to an exemplary embodiment.

Referring now to FIG. 7, a method 700 of ammonia slip management is shown, according to an exemplary embodiment. In various embodiments, ammonia slip may be addressed by temporarily increasing engine out NOx, temporarily decreasing an ammonia to NOx ratio (ANR), and/or limiting an exhaust gas/catalyst gas temperature. In various embodiments, controller 130 may operate the engine 120 to reduce ammonia slip, since the engine 120 may not be mechanically coupled to a powertrain 108 output of the system 100.

At process 710, the controller 130 receive indication of ammonia slip above a threshold or a likelihood of ammonia slip above the threshold within a predefined horizon. In some embodiments, the horizon is a time horizon that corresponds to a predefined period of time. In other embodiments, the horizon is a distance horizon that corresponds to a predetermined distance traveled by a vehicle embodying the system 100. In various embodiments, the controller 130 determines that ammonia slip is likely to occur based on one or more conditions of the aftertreatment system 140. In various embodiments, the controller 130 may determine that ammonia slip is likely to occur based on, for example, an ANR in the aftertreatment system 140 being at or above a predefined threshold value.

In some embodiments, at process 710, the controller 130 may determine to proceed with at least one pathway of the method 700. The pathways include process 720 (e.g., a first pathway), process 730 (e.g., a second pathway), and process 750 (e.g., a third pathway). The controller 130 may select the pathway based on a user input (e.g., a user indication of which pathway to follow).

At process 720 (i.e., the first pathway), the controller 130 operates the engine 120 to generate a higher amount of engine-out NOx relative to a current amount of engine-out NOx. In various embodiments, the higher engine-out NOx amount may react with reductant ammonia (e.g., higher engine power, lower EGR). In various embodiments, the engine 120 may not need to be run at an optimal condition line for fuel economy (i.e., running at a specific engine speed for a corresponding engine power demand). In various embodiments, the controller 130 may operate the engine 120 at conditions away from the optimal operation line. In various embodiments, the controller 130 may manipulate other low level engine control actuations to increase an engine out NOx level.

Responsive to determining that ammonia slip is about to occur at process 710, the method 700 may follow a second path. At process 730 (i.e., a start of the second path), the controller 130 determines an ammonia to NOx ratio.

At process 740, the ANR is temporarily lowered responsive to determining the ANR at process 730. In various embodiments, an embedded ammonia storage estimator (i.e., ammonia storage estimator circuit 260 of the controller 130) may be used to lower ANR to compensate for a SCR ammonia release.

Responsive to determining that ammonia slip is about to occur at process 710, the method 700 may follow a third path. At process 750 (i.e., the third path), a temperature of an exhaust gas and/or a catalyst gas is limited. In various embodiments, the gas temperature may be limited by, for example, the controller 130 limiting engine power motoring the engine 120, and/or the controller 130 deactivating fueling in one or more cylinders of the engine 120. In various embodiments, engine power may be modulated to limit a rate of change of the catalyst temperature. In various embodiments, limiting the rate of change of the catalyst temperature may reduce a storage capacity change of ammonia, which may slow ammonia slip.

In various embodiments, one or more of the pathways (i.e., process 720, processes 730 and 740, and/or process 750) may be implemented alone or in combination to manage ammonia slip.

In some embodiments, the method 700 may be used to address ammonia slip or potential ammonia slip. In some embodiments, the controller 130 may temporarily (e.g., for a predefined period of time) increase an EONOx of the engine 120. In a series hybrid powertrain, such as the powertrain 108, the engine 120 is not mechanically coupled to the powertrain output. Thus, the operation of the engine 120 can be manipulated to mitigate ammonia slip or the likelihood of ammonia slip.

In some embodiments, when the controller 130 determines that an ammonia slip event is likely to occur (e.g., ANR is at or above a threshold), the controller 130 causes the engine 120 to operate at higher engine-out NOx to react with the ammonia (e.g., higher engine power, lower EGR, etc.). In this scenario, the engine 120 does not need to be run at its optimal operation line for fuel economy. Thus, the engine can be operated at conditions away from the optimal operation line.

In some embodiments, the controller 130 may temporarily decrease the ANR in the aftertreatment system 140 and/or temporarily decrease a target ANR value. For example, an embedded ammonia storage estimator may be used to compensate of the SCR ammonia release.

More specifically, the controller 130 may reduce an amount of reductant provided to the aftertreatment system 140 based on an estimated amount of ammonia released by the SCR catalyst 146, thereby lowering the ANR in the aftertreatment system 140.

In some embodiments, the controller 130 may reduce and/or prevent the exhaust gas temperature from increasing by causing the engine 120 to operate in a limited power mode, motoring the engine 120, and/or deactivating fueling in one or more cylinders of the engine 120. In some embodiments, the controller 130 may modulate the engine power when the engine is operating in the limited power mode to mitigate temperature changes in the aftertreatment system 140. In these embodiments, the modulated engine power during the limited power mode may reduce the change in ammonia storage capacity of the SCR catalyst 146, thereby mitigating the ammonia slip.

Figure 8:
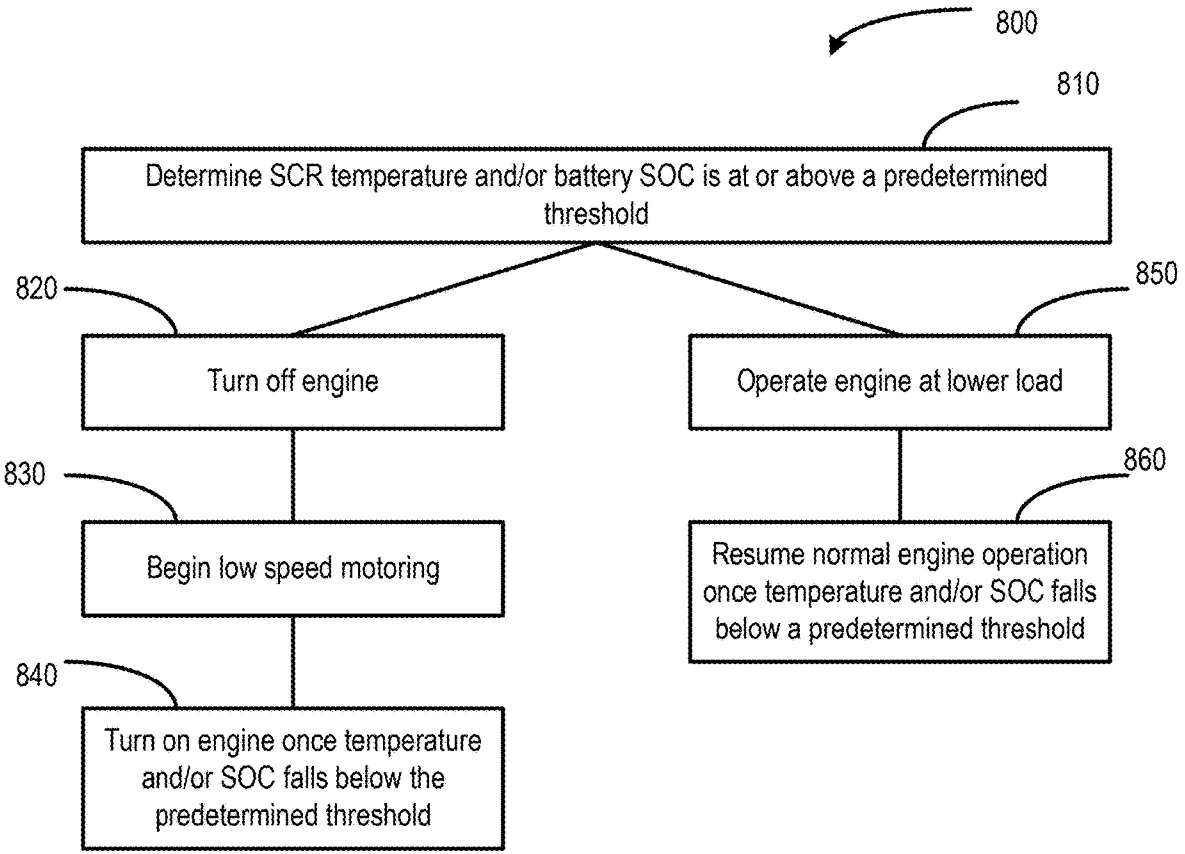
FIG. 8 is a flowchart showing a method of thermal management, according to an exemplary embodiment.

Referring now to FIG. 8, a method 800 of thermal management is shown. In various embodiments, NOx remake may occur at a temperature at or above a predefined threshold. In various embodiments, reducing a temperature of the ASC may reduce NOx remake.

In some embodiments, at process 810, the controller 130 may determine to proceed with at least one pathway of the method 800. The pathways include process 820 (e.g., a first pathway), and process 850 (e.g., a second pathway). The controller 130 may select the pathway based on a user input (e.g., a user indication of which pathway to follow).

At process 810, a temperature value of the SCR and/or a battery SOC is determined to be at or above a predefined threshold. After process 810, the method 800 may follow one of two pathways.

In various embodiments, the first pathway may begin with process 820. At process 820, the controller 130 turns off the engine 120 responsive to determining that a temperature value of the SCR and/or a battery SOC is determined to be at or above the predefined threshold.

At process 830, the controller 130 operates the engine 120 in a low speed motoring state. In various embodiments, low speed motoring may increase convection heat transfer and may reduce a temperature value of the SCR catalyst in a short period of time.

At process 840, the controller 130 turns on the engine 120. In various embodiments, the engine 120 may be turned on responsive to determining that the temperature value is below the predetermined threshold value and/or the SOC is below the predefined threshold.

In various embodiments, responsive to process 810, a second pathway may begin with process 850. At process 850, the controller 130 operates the engine 120 at lower loads with a lower turbine outlet temperature (TOT) relative to a current state of engine operation. In various embodiments, operating at a lower load with a lower TOT may reduce a temperature value of SCR catalyst 146.

At process 860, the controller 130 resumes normal operation of the engine 120. In various embodiments, normal engine operation is resumed responsive to determining that the temperature is below a predetermined threshold value and/or the SOC is below a predefined threshold.

In various embodiments, the method 800 may be performed with the method 700 (e.g., thermal management of the engine 120 may occur while managing ammonia slip of the aftertreatment system).

In various embodiments, the method 800 is used to mitigate NOx remake. For example, reducing the temperature of the ASC catalyst 147 may mitigate the NOx remake. Depending on the temperature of the SCR catalyst 146 and battery SOC the controller 130 can use one or more strategies to mitigate NOx remake.

In some embodiments, the controller 130 causes the engine 120 to turn off. In some embodiments, the controller 130 also motors the engine 120 at a low speed (e.g., a speed below a low-speed threshold) to actively reduce the temperature of the SCR catalyst 146. The controller 130 may start the engine responsive to the temperature of the SCR catalyst 146 being at or below a predefined threshold and/or responsive to the SOC of the battery 105 being at or below a predefined threshold.

In some embodiments, the controller 130 may cause the engine 120 to operate in the reduced power mode. When the engine 120 is operating in the reduced power mode, the TOT of the engine 120 is also reduced, thereby reducing the temperature of the SCR catalyst 146. The controller 130 may cause the engine 120 to operate in the normal operating mode responsive to the temperature of the SCR catalyst 146 being at or below a predefined threshold and/or responsive to the SOC of the battery 105 being at or below a predefined threshold.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 130 may include any number of circuits for completing the functions described herein. For example, the activities and functionalities of the engine circuit 230, the heater circuit 240, the pump circuit 250 and/or the ammonia storage estimator circuit 260 may be combined in multiple circuits or as a single circuit. Additional circuits with additional functionality may also be included. Further, the controller 130 may further control other activity beyond the scope of the present disclosure.

As mentioned above and in one configuration, the "circuits" may be implemented in machine-readable medium for execution by one or more of various types of processors, such as the processor 212 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electromagnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A system for managing emissions of a hybrid vehicle, the system comprising:

a controller comprising at least one processor and at least one memory device storing instructions that, when executed by the at least one processor, cause the controller to perform operations comprising:

activating a heater responsive to a state of charge of a battery of the hybrid vehicle being at or above a predefined threshold;

activating an air mover to move air through an aftertreatment system of the hybrid vehicle and causing the air to be heated by the heater such that the heated air heats the aftertreatment system;

receiving a temperature of the aftertreatment system responsive to activating the air mover;

causing an engine of the hybrid vehicle to operate in a modified power mode such that a power output of the engine is below a power output threshold responsive to determining that the temperature of the aftertreatment system is at or above a first threshold and below a second threshold;

causing the engine to operate in a normal operating mode such that the power output of the engine is at or above the power output threshold responsive to determining that the temperature of the aftertreatment system is at or above the second threshold; and deactivating the heater responsive to determining that the temperature of the aftertreatment system is at or above the second threshold.

2. The system of claim 1, wherein the air mover includes an electric machine of the hybrid vehicle, and wherein the moving air is based on activation of the electric machine to cause motoring of the engine.

3. The system of claim 1, wherein the air mover includes an air pump.

4. The system of claim 1, wherein in the modified power mode, the instructions, when executed by the at least one processor, cause the controller to perform operations further comprising at least one of limiting an amount of fuel provided to the engine or limiting an amount of air provided to the engine.

5. The system of claim 1, wherein the instructions, when executed by the at least one processor, cause the controller to perform operations further comprising causing the engine to operate in a second modified power mode different from the modified power mode, responsive to the state of charge of the battery being below the predefined threshold.

6. The system of claim 1, wherein the instructions, when executed by the at least one processor, cause the controller to perform operations further comprising causing the engine of the hybrid vehicle to operate in the modified power mode for a predefined period of time.

7. The system of claim 1, wherein the instructions, when executed by the at least one processor, cause the controller to perform operations further comprising deactivating the air mover responsive to causing the engine of the hybrid vehicle to operate in the modified power mode.

8. A system for managing emissions of a hybrid vehicle, the system comprising:

a battery; and a controller coupled to the battery, the controller comprising at least one processor and at least one memory device storing instructions that, when executed by the at least one processor, cause the controller to perform operations comprising:

determining an end of a drive cycle of the hybrid vehicle;

receiving a temperature of an aftertreatment system responsive to determining the end of the drive cycle of the hybrid vehicle;

determining an ammonia-to-NOx ratio (ANR) of the aftertreatment system responsive to determining the end of the drive cycle of the hybrid vehicle; and managing an operation of an engine of the hybrid vehicle to at least one of (i) lower the temperature of the aftertreatment system responsive to determining that the temperature of the aftertreatment system is at or above a first threshold or (ii) lower the ANR of the aftertreatment system responsive to determining that the ANR of the aftertreatment system is below a second predefined threshold.

9. The system of claim 8, wherein managing the operation of the engine comprises initiating a shutdown procedure of the engine, wherein the shutdown procedure comprises operating the engine at or below a predefined low load value.

10. The system of claim 9, wherein the instructions, when executed by the at least one processor, cause the controller to perform operations comprising:

prior to initiating the shutdown procedure, at least one of (i) increasing, relative to an initial duration of time between the end of the drive cycle and initiation of the shutdown procedure, a duration of a predefined period of time that elapses before the shutdown procedure of the engine is initiated or (ii) reducing an idle load on the engine.

11. The system of claim 10, wherein the predefined period of time begins at the end of the drive cycle and ends when the shutdown procedure is initiated.

12. The system of claim 8, wherein managing the operation of the engine comprises operating the engine at or below a predefined load value for a predefined period of time.

13. The system of claim 8, wherein the instructions, when executed by the at least one processor, cause the controller to perform operations further comprising determining the end of the drive cycle of the hybrid vehicle by at least one of: (i) determining that a vehicle speed of the hybrid vehicle is at or below a predetermined threshold value for a predetermined period of time or (ii) receiving data indicating that the hybrid vehicle has arrived at a predefined destination.

14. A method for managing emissions of a hybrid vehicle, the method comprising:

activating, by one or more processors, an air mover to move air through an aftertreatment system responsive to determining that an ammonia level in the aftertreatment system is below a first predefined threshold;

increasing, by the one or more processors, a temperature of the moving air relative to a current temperature of the moving air responsive to activating the air mover;

activating, by the one or more processors, a doser of the aftertreatment system responsive to the temperature of the moving air being at or above a second predefined threshold; and starting or enabling a starting of, by the one or more processors, an engine of the hybrid vehicle responsive to the ammonia level of the aftertreatment system being at or above the first predefined threshold.

15. The method of claim 14, wherein the air mover includes an electric machine of the hybrid vehicle, and wherein the moving air is based on activation of the electric machine to cause motoring of the engine.

16. The method of claim 15, wherein the method further comprises activating an engine exhaust gas recirculation valve to increase the temperature of the moving air responsive to moving the air by the motoring of the engine.

17. The method of claim 14, wherein the air mover is an air pump.

18. The method of claim 14, wherein the method further comprises activating a heater to increase the temperature of the moving air.

19. The method of claim 14, wherein the method further comprises determining that the ammonia level of the aftertreatment system is at or above the first predefined threshold based on at least one of (i) the temperature of the moving air being at or above the second predefined threshold for a threshold period of time, (ii) an amount of fluid delivered by the doser being at or above a threshold value, or (iii) a value of ammonia storage being at or above a threshold value.

20. The method of claim 19, wherein the method further comprises determining, by the one or more processors, the value of ammonia storage value based on a NOx conversion efficiency and an ammonia to NOx ratio (ANR).

* * * * *